United States Patent
Cao

(10) Patent No.: US 11,169,801 B2
(45) Date of Patent: Nov. 9, 2021

(54) HYBRID QUANTUM-CLASSICAL COMPUTER FOR VARIATIONAL COUPLED CLUSTER METHOD

(71) Applicant: Zapata Computing, Inc., Boston, MA (US)

(72) Inventor: Yudong Cao, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 0 days.

(21) Appl. No.: 17/272,189

(22) PCT Filed: Oct. 4, 2019

(86) PCT No.: PCT/US2019/054795
§ 371 (c)(1),
(2) Date: Feb. 26, 2021

(87) PCT Pub. No.: WO2020/142122
PCT Pub. Date: Jul. 9, 2020

(65) Prior Publication Data
US 2021/0255856 A1      Aug. 19, 2021

Related U.S. Application Data

(60) Provisional application No. 62/742,037, filed on Oct. 5, 2018.

(51) Int. Cl.
*G06F 15/16*      (2006.01)
*G06F 9/30*       (2018.01)
*G06N 10/00*      (2019.01)

(52) U.S. Cl.
CPC .......... *G06F 9/3001* (2013.01); *G06N 10/00* (2019.01)

(58) Field of Classification Search
CPC ........ G06F 15/16; G06F 9/3001; G06N 10/00
See application file for complete search history.

(56) References Cited

U.S. PATENT DOCUMENTS 7,590,607 B2 *  9/2009  Williams ............... G06N 10/00
                                                706/45
8,832,164 B2 *  9/2014  Allen .................... G06N 10/00
                                                708/200

(Continued)

FOREIGN PATENT DOCUMENTS

WO      2018064535 A1    4/2018
WO      2020142122 A2    7/2020

OTHER PUBLICATIONS

Terashima, Nonunitary Quantum Circuit, 2005, International Journal of Quantum Information 3 (2005) 633-647. (Year: 2005).*

(Continued)

*Primary Examiner* — Cheng Yuan Tseng
(74) *Attorney, Agent, or Firm* — Blueshift IP, LLC; Robert Plotkin

(57) ABSTRACT

A hybrid quantum classical (HQC) computer, which includes both a classical computer component and a quantum computer component, solves linear systems. The HQC decomposes the linear system to be solved into subsystems that are small enough to be solved by the quantum computer component, under control of the classical computer component. The classical computer component synthesizes the outputs of the quantum computer component to generate the complete solution to the linear system.

12 Claims, 6 Drawing Sheets

(56) References Cited

U.S. PATENT DOCUMENTS

| | | | | |
|---|---|---|---|---|
| 8,832,165 | B2* | 9/2014 | Allen | G06N 10/00 |
| | | | | 708/200 |
| 8,897,449 | B1* | 11/2014 | Broadbent | H04L 9/0852 |
| | | | | 380/277 |
| 9,064,067 | B2* | 6/2015 | Wecker | G06N 10/00 |
| 9,477,796 | B2* | 10/2016 | Garcia-Ramirez | G06F 30/20 |
| 10,242,321 | B2* | 3/2019 | Bocharov | G06N 10/00 |
| 10,275,717 | B2* | 4/2019 | Babbush | G06N 5/003 |
| 10,572,816 | B1* | 2/2020 | Vavilov | H03K 19/195 |
| 10,666,462 | B2* | 5/2020 | Shin | H04L 25/0272 |
| 10,776,709 | B2* | 9/2020 | Shen | B82Y 10/00 |
| 10,990,677 | B2* | 4/2021 | Wiebe | G06N 20/20 |
| 11,010,682 | B2* | 5/2021 | Bocharov | G06F 30/00 |
| 2005/0167658 | A1 | 8/2005 | Williams | |
| 2019/0318053 | A1* | 10/2019 | Low | G06F 30/20 |
| 2019/0394030 | A1* | 12/2019 | Forbes | H04L 9/0852 |
| 2020/0104740 | A1* | 4/2020 | Cao | G06N 10/00 |
| 2020/0293936 | A1* | 9/2020 | Granade | G06N 10/00 |
| 2020/0327441 | A1* | 10/2020 | Cao | G06N 10/00 |
| 2020/0334107 | A1* | 10/2020 | Katabarwa | H03M 13/47 |
| 2020/0349459 | A1* | 11/2020 | Cao | G06F 17/16 |
| 2021/0011748 | A1* | 1/2021 | Lee | G06F 9/45504 |

OTHER PUBLICATIONS

Gingrich, Non-Unitary Probabilistic Quantum Computing, 2003, ACM, pp. 1-6. (Year: 2003).*

Cao, "Hybrid quantum-classical algorithm for variational coupled cluster method", APS Mar. Meeting 2019, vol. 34, No. 2, Monday-Friday, March pp. 4-8, 2019; Boston, Massachusetts.

Voorhis T. V. et al., "Benchmark variational coupled cluster doubles results", Journal of Chemical Physics, 113(20):8873-8879, 2000.

Peruzzo, A., et al., "A variational eigenvalue solver on a photonic quantum processor", Nature Communications, vol. 5, 4213, pp. 1-7, 2014.

Harsha, G. et al., "On the difference between variational and unitary coupled cluster theories", J. Chem. Phys. vol. 148, 044107, pp. 1-6, (2018).

Evangelista, F. A., "Alternative single-reference coupled cluster approaches for multireference problems: The simpler, the better", Journal of Chemical Physics, vol. 134(22), pp. 1-13, 2011.

Nielsen, M., "The Fermionic canonical commutation relations and the Jordan-Wigner transform", michaelnielsen.org, pp. 1-8, 2005.

Bravyi, L. D., et al., "Fermionic Quantum Computation," Annals of Physics, vol. 298, No. 1, pp. 210-226 (2002).

Setia, K. et al., "Bravyi-Kitaev Superfast simulation of fermions on a quantum computer", arXiv:1712.00446v3 pp. 1-13, 2017.

Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).

Helgaker T. et al., "Molecular Electronic-Structure Theory", Book published by John Wiley & Sons, pp. 1-908, 2000.

Childs, A. M. et al., "Hamiltonian simulation using linear combinations of unitary operations", Quantum Information and Computation, vol. 12, pp. 901-924, 2012.

Childs, A. M., et al., "Quantum algorithm for systems of linear equations with exponentially improved dependence on precision", arXiv:1511.02306v2, pp. 1-31 (2017).

Kothari, R., "Efficient algorithms in quantum query complexity", PhD thesis, University of Waterloo, pp. 1-128, 2014.

Grover, L. K., "Fixed-point quantum search", Physical Review Letters, Issue No. 95, vol. 15, pp. 1-13, Oct. 2005.

Guerreschi, G. G., "Repeat-Until-Success circuits with fixed-point oblivious amplitude amplification", Phys. Rev. A 99, 022306 pp. 1-13, Aug. 10, 2018.

McClean, J. R., et al., "The theory of variational hybrid quantum-classical algorithms", New Journal of Physics, vol. 18, pp. 1-22 (Feb. 5, 2016).

Terashima, H. et al., "Nonunitary quantum circuit", International Journal of Quantum Information, vol. 3, No. 4, pp. 1-19, Apr. 6, 2005.

Zujev A., "Note on Non-Unitary Quantum Gates in Quantum Computing", Working Paper, University of California, Davis, DOI: 10.13140/RG.2.2.30712.85767, pp. 1-3, 2017.

International Search Report & Written Opinion dated Jul. 30, 2020, in international patent application No. PCT/US2019/054795, 8 pages.

Berry, D. W. et al., "Simulating Hamiltonian Dynamics with a Truncated Taylor Series", Phys. Rev. Lett. 114, 090502 pp. 1-5, Mar. 3, 2015.

Brassard, G., et al., "Quantum Amplitude Amplification and Estimation", arXiv:quant-ph/0005055v1, pp. 1-22( May 15, 2000).

Buhrman, H. et al., "Quantum fingerprinting", Physical Review Letters, vol. 87, Issue No. 16, pp. 1-8, Sep. 2001.

Childs, A. M. et al., "Quantum algorithm for systems of linear equations with exponentially improved dependence on precision", SIAM Journal on Computing vol. 46, Issue No. 6, pp. 1-31, Jan. 2017.

Grover, L.K., "A fast quantum mechanical algorithm for database search", STOC '96: Proceedings of the twenty-eighth annual ACM symposium on Theory of Computing, pp. 1-8 (Jul. 1996).

McClean, J. R., et al., "Barren plateaus in quantum neural network training landscapes", Nature Communications, vol. 9, pp. 1-6, 2018.

Preskill, J., "Quantum Computing in the NISQ era and beyond", pp. 1-20, Jul. 31, 2018.

Yamada, S. et al., "High Performance LOBPCG Method for Solving Multiple Eigenvalues of Hubbard Model:. Efficiency of Communication Avoiding Neumann Expansion Preconditione", In: Yokota R., Wu W. (eds). Supercomputing Frontiers. SCFA 2018. Lecture Notes in Computer Science, vol. 10776. Springer, Cham, pp. 243-256.

Theodore J. Y. et al., "Fixed-point quantum search with an optimal number of queries", Physical Review Letters, Issue No. 113, vol. 21, pp. 210501-210505, Nov. 2014.

* cited by examiner

HYBRID QUANTUM-CLASSICAL COMPUTER FOR VARIATIONAL COUPLED CLUSTER METHOD

BACKGROUND

Quantum computers promise to solve industry-critical problems which are otherwise unsolvable. Key application areas include chemistry and materials, bioscience and bioinformatics, and finance. Interest in quantum computing has recently surged, in part, due to a wave of advances in the performance of ready-to-use quantum computers.

Electronic structure problems of strongly correlated systems are among the hardest problems in computational quantum chemistry. They are also of prominent importance because solutions to these problems contain important information about the chemical process under consideration. In the strongly correlated regime, due to entanglement of electronic states, mean field approximations such as Hartree-Fock theory typically fail to capture a significant portion of the ground state energy. In these scenarios, correlated methods such as coupled cluster (CC) and configuration interaction (CI) techniques are used to refine the mean field approximation using physically motivated ansatz wavefunctions. However, both CI and CC have limitations. For example, truncated CI is not size extensive, while full CI methods are not computationally efficient. Coupled cluster methods are able to recover some correlation energy, while its disadvantage is that the coupled cluster energy is not a variational upper bound to the true ground state energy.

Two existing variants of the coupled cluster method, namely unitary coupled cluster (uCC) and variational coupled cluster (vCC), have delivered superior performance to CC, but are too computationally expensive to be implemented on classical computers. It is known that uCC can be implemented efficiently on a quantum computer, thereby making it a viable tool for future quantum chemists once scalable quantum devices have been achieved.

The other variant, however, vCC, has gone largely unexplored. Numerical evidence gleaned from the few instances of vCC implementations show that in the strongly correlated regime at the same level of truncation, vCC could deliver even higher ground state energy than uCC.

What is needed, therefore, are improved techniques for implementing vCC on near-term quantum computers. Such improvements would have a wide variety of applications in science and engineering.

SUMMARY

A hybrid quantum classical (HQC) computer, which includes both a classical computer component and a quantum computer component, implements improved variational coupled cluster (vCC) methods.

In one aspect, a method is performed by a classical computer for implementing, on a quantum computer, a non-unitary operation of the form I+aU, where I is the identity operator, $\alpha$ is a scalar, and U is a unitary operator; the quantum computer having a plurality of qubits, including an ancilla qubit; the classical computer including a processor, a non-transitory computer-readable medium, and computer program instructions stored in the non-transitory computer-readable medium, the computer program instructions being executable by the processor to perform the method. The method includes: (A) generating and storing, in the non-transitory computer-readable medium, computer-readable data representing a description of a first quantum circuit W which, when executed by the quantum computer, probabilistically realizes the non-unitary operation by the technique of linear combination of unitaries; (B) generating and storing, in the non-transitory computer-readable medium, computer-readable data representing a description of a second quantum circuit, the second quantum circuit comprising a sequence of quantum gates $S_d = S_{d-1} RS_{d-1}^\dagger RS_{d-1}$ parametrized by an integer d, wherein $S_0 = WRW^\dagger RW$ and wherein $$R = \begin{pmatrix} 1 & 0 \\ 0 & e^{i\pi/3} \end{pmatrix}$$

is a single-qubit rotation applied to the ancilla qubit.

The method may further include: (C) on the quantum computer, executing the first quantum circuit to probabilistically realize the non-unitary operation by the technique of linear combination of unitaries. The method may further include: (D) on the quantum computer, executing the second quantum circuit, comprising executing the sequence of quantum gates $S_d = S_{d-1} R_{d-1}^\dagger = ?S_{d-1}$-(D) may include, on the quantum computer: (D)(1) applying a single-qubit rotation $R_a$ to transform the ancilla qubit into the state $$\frac{1}{\sqrt{1+\alpha}}|0\rangle + \sqrt{\frac{\alpha}{1+\alpha}}|1\rangle;$$

(D)(2) applying controlled-U operator on a subset of the plurality of qubits, not including the ancilla qubit, conditioned on the ancilla qubit being in the state $|1\rangle$; and (D)(3) applying $R_a^\dagger$, on the ancilla qubit.

The method may further include generating and storing, in the non-transitory computer-readable medium, additional computer-readable data that, when executed on the quantum computer, causes the second quantum circuit to execute repeatedly, on the quantum computer, to perform a sequence of operations $$\prod_{i=1}^{r} \prod_{j=1}^{k} \left(1 + \frac{\iota \kappa_j}{r} P_j\right),$$

that approximates the operator $e^{iT(\vec{\kappa})}$ with t being a scalar and $$T(\vec{\kappa}) = \sum_{j=1}^{k} \kappa_j P_j$$

being the cluster operator which is a linear combination of operators $P_j$ parametrized by weights k.

The method may further include: (C) performing mean-field approximation to generate and store, in the non-transitory computer-readable medium, computer-readable data representing a description of a third quantum circuit to prepare a reference state; (D) generating and storing, in the non-transitory computer-readable medium, computer-readable data representing a description of a parametrized quantum circuit for approximating $e^{iT(\vec{\kappa})}$ (E) on the quantum computer, executing the third quantum circuit to prepare the reference state; (F) on the quantum computer, applying the parametrized quantum circuit to the reference state to generate the ansatz state $|\psi(\vec{K})\rangle$; (G) using the classical computer in cooperation with the quantum computer to measure an energy of the ansatz $|\psi(\vec{K})\rangle$; and (H) on the classical computer, iteratively tuning the parameters k to minimize the energy of the ansatz $|\psi(\vec{K})\rangle$.

In another aspect, a system includes: a classical computer the classical computer including a processor, a non-transitory computer-readable medium, and computer program instructions stored in the non-transitory computer-readable medium; a quantum computer comprising a plurality of qubits, including an ancilla qubit; wherein the computer program instructions, when executed by the processor, perform a method for implementing, on the quantum computer, a non-unitary operation of the form I+aU, where I is the identity operator, α is a scalar, and U is a unitary operator. The method includes: (A) generating and storing, in the non-transitory computer-readable medium, computer-readable data representing a description of a first quantum circuit W which, when executed by the quantum computer, probabilistically realizes the non-unitary operation by the technique of linear combination of unitaries; (B) generating and storing, in the non-transitory computer-readable medium, computer-readable data representing a description of a second quantum circuit, the second quantum circuit comprising a sequence of quantum gates $S_d = S_{d-1} R S_{d-1}^\dagger R S_{d-1}$ parametrized by an integer d, wherein $S_0 = W R W^\dagger R W$ and wherein $$R = \begin{pmatrix} 1 & 0 \\ 0 & e^{i\pi/3} \end{pmatrix}$$

is a single-qubit rotation applied to the ancilla qubit.

The method may further include: (C) on the quantum computer, executing the first quantum circuit to probabilistically realize the non-unitary operation by the technique of linear combination of unitaries. The method may further include: (D) on the quantum computer, executing the second quantum circuit, comprising executing the sequence of quantum gates $S_d = S_{d-1} R S_{d-1}^\dagger R S_{d-1}$. (D) may include, on the quantum computer: (D)(1) applying a single-qubit rotation $R_a$ to transform the ancilla qubit into the state $$\frac{1}{\sqrt{1+\alpha}} |0\rangle + \sqrt{\frac{\alpha}{1+\alpha}} |1\rangle;$$

(D)(2) applying controlled-U operator on a subset of the plurality of qubits, not including the ancilla qubit, conditioned on the ancilla qubit being in the state $|1\rangle$; and (D)(3) applying $R_a^\dagger$, on the ancilla qubit.

The method may further include generating and storing, in the non-transitory computer-readable medium, additional computer-readable data that, when executed on the quantum computer, causes the second quantum circuit to execute repeatedly, on the quantum computer, to perform a sequence of operations $$\prod_{i=1}^{r} \prod_{j=1}^{k} \left(1 + \frac{t\kappa_j}{r} P_j\right),$$

that approximates the operator $e^{tT(\vec{K})}$ with t being a scalar and $$T(\vec{\kappa}) = \sum_{j=1}^{k} \kappa_j P_j$$

being the cluster operator which is a linear combination of operators $P_j$ parametrized by weights $\vec{K}$.

The method may further include: (C) performing mean-field approximation to generate and store, in the non-transitory computer-readable medium, computer-readable data representing a description of a third quantum circuit to prepare a reference state; (D) generating and storing, in the non-transitory computer-readable medium, computer-readable data representing a description of a parametrized quantum circuit for approximating $e^{tT(\vec{K})}$ (E) on the quantum computer, executing the third quantum circuit to prepare the reference state; (F) on the quantum computer, applying the parametrized quantum circuit to the reference state to generate the ansatz state $|\psi(\vec{K})\rangle$; (G) using the classical computer in cooperation with the quantum computer to measure an energy of the ansatz $|\psi(\vec{K})\rangle$; and (H) on the classical computer, iteratively tuning the parameters k to minimize the energy of the ansatz $|\psi(\vec{K})\rangle$.

Other features and advantages of various aspects and embodiments of the present invention will become apparent from the following description and from the claims.

DETAILED DESCRIPTION

Figure 1:
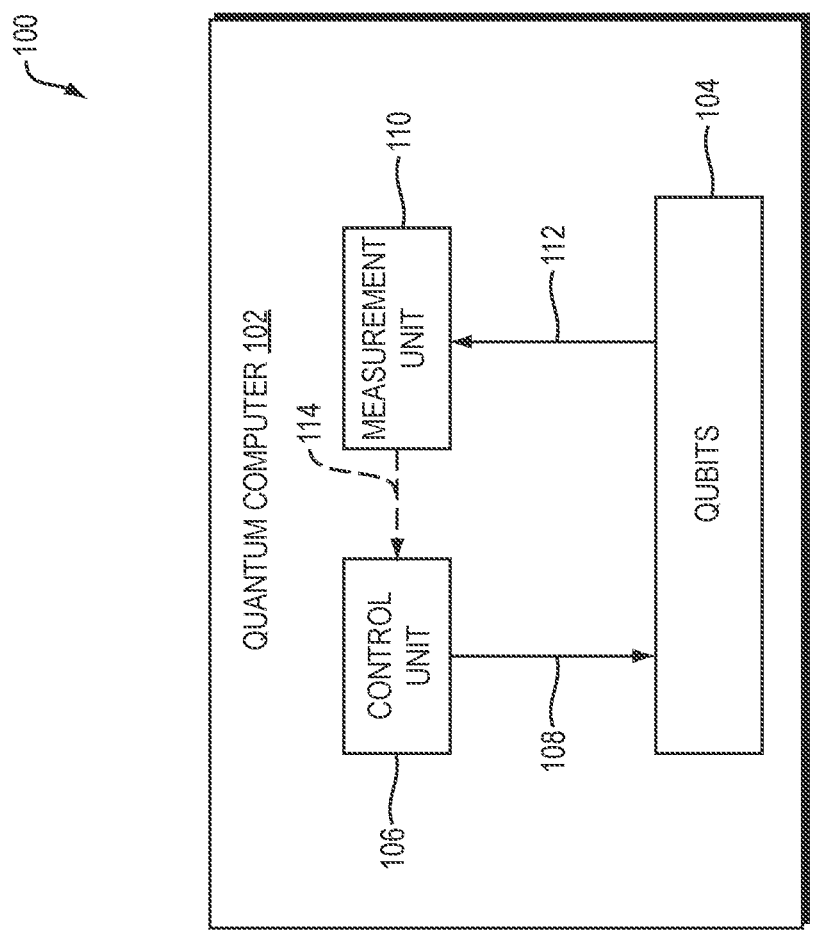
FIG. 1 shows a diagram of a system implemented according to one embodiment of the present invention.

Embodiments of the present invention are directed to a hybrid quantum classical (HQC) computer, which includes both a classical computer component and a quantum computer component, and which implements improved variational coupled cluster (vCC) methods. One benefit of the improved vCC methods of embodiments of the present invention is that, unlike uCC methods, they broaden the repertoire of ansatzes within the reach of future quantum chemists with access to scalable fault-tolerant quantum computers.

The potential of quantum computers for simulating quantum systems was first noticed in the 1980s, and has been put on more concrete footing since the late 90s. The ability to directly prepare and measure wavefunctions of molecular systems rather than painstakingly encoding such quantum information into classical computers promises to provide a natural means of performing many quantum chemistry calculations, bypassing the exponential computational requirements of classical algorithms for simulating quantum systems.

Although quantum chemistry is widely understood to be a canonical application for quantum computers, several quantum chemistry problems of interest are known to be hard. A typical example is the QMA-completeness of estimating the ground state energy of a k-local Hamiltonian for $k \geq 2$ when the spectral gap scales inverse polynomially in the system size. In spite of such complexity associated with these problems, it is widely believed that physical systems have Hamiltonians that are classically intractable without being hard cases of the QMA class. Furthermore, there are still reasonable classical approximation algorithms that have been developed to study the chemistry of quantum systems.

One attractive class of methods that attack the ground state energy problem chooses a parametrized trial solution to the ground state problem for the given Hamiltonian, and optimizes the parameters by treating the energy expectation value as the objective function to minimize. Ideally, one would hope for this optimization to be performed in a variational framework, which would ensure (by the variational theorem) that the estimate outputted by the algorithm is an upper bound on the true ground state energy of the system. A popular family of trial functions that has been found to give accurate results uses an exponential parametrization and gives rise to the Coupled Cluster (CC) methods. However, performing variational optimization with CC trial functions is computationally intractable on classical computers, generally requiring time exponential in the number of electrons and orbitals, rendering it impractical for most quantum chemistry applications. Several non-variational algorithms have nevertheless been developed and found to be practically useful, despite being expensive to implement on classical computers. These variants require one to solve systems of coupled non-linear equations to obtain an approximation to the optimal parameter values.

These CC methods have played an instrumental role in addressing problems related to quantum systems in the strongly correlated regime. Molecular systems with strong correlation effects typically have wavefunctions of a "multiconfigurational" nature, which means that they have collective excitations coming from several reference wavefunctions chosen for an ab-initio approximation scheme. Both single-reference CC methods that take into account high rank excitations, and multireference CC methods have been developed to tackle such cases. One of the strengths of CC methods is their scaling properties, of especial importance for treating large molecules and solid-state systems. CC methods have been rigorously shown (using (diagrammatic) many body perturbation theory) to be 'size extensive', which means that quantities of interest, such as the energy, have the correct scaling in the size, or number of electrons, in the system.

But a significant drawback of traditional CC methods is that the energy expectation obtained by these approximation algorithms is not a variational upper bound on the true energy eigenvalues of the Hamiltonian. This stems from two reasons: the use of a similarity transformed Hamiltonian and an asymmetric expectation value, and the lack of a normalization constraint on the trial wavefunction. Both of these compromises are introduced in order to obtain tractable computational tools. Circumventing these issues to obtain polynomial time classical algorithms is widely believed to be impossible.

Quantum computers, however, can perform computation in some ways that are believed to be beyond classical computing. While classical approaches for electronic structure calculations commonly struggle to maintain and handle the full many-body wavefunctions due to their exponential size, such tasks can be efficiently performed on quantum computers in many cases. A salient example is the recent scheme in variational quantum eigensolvers (VQE) using the unitary coupled cluster (uCC) ansatz, where the parametrized variational trial wavefunction is adjusted by alternating between quantum measurement and classical optimization of parameters such that the energy expectation is minimized. However, another CC variant, the variational coupled cluster (vCC) method, has not received much attention in the quantum computing literature due to the non-unitary nature of the operator used to generate the ansatz wavefunction, and intrinsic difficulties in implementing such non-unitary operations on a unitary quantum computer.

Although vCC is computationally expensive on classical computers, there is numerical evidence for small systems to suggest that it yields superior empirical performance over traditional projected CC and uCC. It has been shown that by choosing the model of a Lipkin Hamiltonian, uCC and vCC calculations give very different results for strongly correlated systems. This is also illustrated by benchmarking calculations performed for problems such as computing the potential energy surface of Hydrogen Fluoride, the Nitrogen molecule, and symmetric stretching of the water molecule, where vCC is seen to perform better than uCC, especially at larger bond lengths.

Some VQE methods based on uCC, as well as other variants of CC, have been studied by the quantum computing community in the last few years. In contrast, hybrid quantum-classical algorithms for vCC have not yet been explored, one reason being that the ansatz states are obtained from an initial reference state by applying a non-unitary operator. Embodiments of the present invention include a scheme for efficiently preparing vCC ansatz states on a quantum computer. By integrating this ability with the VQE framework, embodiments of the present invention broaden the set of tools available for treating strongly correlated systems on a quantum computer. Techniques disclosed herein for state preparation combine the two algorithmic ingredients of implementing linear combination of unitaries, and fixed-point oblivious amplitude amplification. Embodiments of the present invention take advantage of the special structure of the coupled cluster operator, writing it as a linear combination of tensor products of single-qubit Pauli matrices in order to provide a quantum algorithm that prepares the CC ansatz wavefunction with asymptotic complexity $\tilde{\mathcal{O}}(\ell m^\ell n^\ell)$. Unlike classical methods for vCC, which incur cost that is exponential in m and n, simply due to the curse of dimensions, the cost of our method is only poly(m,n) for fixed level of excitations $\ell$. The energy expectation of these wavefunctions can be estimated to precision E using a number of samples that scales as $$\tilde{\mathcal{O}}\left(poly(m,n) \cdot \frac{1}{\epsilon^2}\right).$$

using standard procedures such as Hamiltonian averaging.

In particular, for vCCSD, the vCC method truncated at double excitations, embodiments of the present invention obtain quantum circuits that prepare the ansatz wavefunctions in time that scales as $\mathcal{O}(m^2n^2)$ or $\mathcal{O}(m^4)$ for a constant orbital filling fraction, matching the asymptotic complexity demonstrated for the uCC method.

The following is organized as follows. First, a theory behind coupled cluster methods of embodiments of the present invention is described. Then an embodiment of a quantum algorithm for preparing parametrized CC ansatz states is described. Then a description is provided of how the ansatz may be used with the VQE for ground state calculations. Then, advantages and drawbacks of embodiments of the present invention are described.

Broadly speaking, the goal of quantum chemistry techniques such as vCC is to find approximations to the ground state energy and wavefunction of a specified Hamiltonian. One example that will be discussed here is the case of a molecular Hamiltonian, although the techniques described herein may be used to treat other kinds of systems as well (e.g., atomic nuclei). Embodiments of the present invention may be applied to the ground state properties of molecular electronic Hamiltonians, simplified by neglecting nuclear motion, which have the general form $$\hat{H} = \sum_i \frac{\nabla_i^2}{2} - \sum_i \frac{Z}{|\vec{r}_i|} + \sum_{ij} \frac{1}{|\vec{r}_i - \vec{r}_j|}, \quad (1)$$

in atomic units, where Z is the nuclear charge, and $r_i$ denotes the position of the $i^{th}$ electron.

A quantum system of n electrons may be treated with a basis of m spin orbitals, thereby restricting attention to a finite dimensional subspace of the full domain of the unbounded operator in Eqn. 1. A canonical way of writing down the Hamiltonian restricted to the corresponding finite-dimensional subspace of the Hilbert space of the system is in second quantization, in terms of creation and annihilation operators of the chosen basis $$\hat{H} = \sum_{ij} h_{ij} \hat{a}_i^\dagger \hat{a}_j + \frac{1}{2} \sum_{ijkl} h_{ijkl} \hat{a}_i^\dagger \hat{a}_j^\dagger \hat{a}_k \hat{a}_l, \quad (2)$$

and indeed, any Hamiltonian may be written in this Fock space or occupation number representation. Here the indices range over the spin orbitals and the coefficients $h_{ij}$ and $h_{ijkl}$ are classically precomputed electronic overlap integrals representing the matrix elements of the one particle and two particles terms of the Hamiltonian in the chosen basis. In particular, when the Born-Oppenheimer approximation of neglecting nuclear motion is applied, these coefficients are computed under a particular fixed geometry and may be efficiently performed on a classical computer. Recall that the creation and annihilation operators satisfy fermionic anti-commutation relations $$\{a_i, a_j\} := a_i a_j + a_j a_i = 0, \quad (3)$$
$$\{a_i^\dagger, a_j^\dagger\} = 0, \{a_i, a_j^\dagger\} = \delta_{ij} I.$$

The second quantization approach differs from first quantization in incorporating the anti-symmetry constraint on fermionic states into the definition of the operators rather than the wavefunctions themselves. Furthermore, it has the advantage that the wavefunction may be more efficiently represented in the molecular orbital basis as compared to a cartesian basis or grid chosen for a first quantized approach. As a result, methods using first quantization lead to shallow but wide circuits, whereas those using second quantization lead to deeper circuits but require significantly fewer resources for smaller scale simulations.

To find the ground state of the Hamiltonian in (2), coupled cluster theory introduces an (unnormalized) ansatz wavefunction of the form $|\psi\rangle = e^{\hat{T}}|\Psi_0\rangle$, where $|\Psi_0\rangle$ is a reference state that is suitably chosen for the problem at hand (e.g., as a Slater determinant of Hartree-Fock orbitals). $\hat{T}$ is called the cluster operator and has the form $\hat{T} = \hat{T}^{(1)} + \hat{T}^{(2)} + \ldots + \hat{T}^{(n)}$, where each $\hat{T}^{(\ell)}$ is an operator representing the $\ell$-th order excitation of electrons from occupied spin orbitals to unoccupied (or virtual) spin orbitals:

$$\hat{T}^{(\ell)} = \frac{1}{(\ell!)^2} \sum_{\substack{a_1,\ldots,a_\ell \in occupied \\ b_1,\ldots,b_\ell \in virtual}} t_{a_1\ldots a_\ell}^{b_1\ldots b_\ell} a_{b_1}^\dagger a_{b_2}^\dagger \ldots a_{b_\ell}^\dagger a_{a_\ell} a_{a_{\ell-1}} \ldots a_{a_1}. \quad (4)$$

For an n electron system, all terms higher than $\hat{T}^{(n)}$ vanish because there cannot be more than n excitations. In practice, the highest level of excitations $\ell$ is typically limited to be small. For example, one of the most popular coupled cluster variants is CCSD, which involves only single and double excitations (i.e., $\ell \leq 2$). The method including triple excitations, CCSDT, or treating such excitations with perturbation theory, CCSD(T), has found widespread praise as the gold standard of quantum chemistry calculations. This is due in large part to the ability of this method to accurately compute nearly 99.5% of the correlation energy (with respect to Full Configuration Interaction calculations) for small to medium sized atoms and molecules, despite its non-variational nature.

The intuition behind using an exponentially parametrized family of trial functions comes from many body perturbation theory and statistical mechanics. The CC wavefunction accounts for static correlations between electrons by assigning non-zero amplitudes to Hilbert space states that represent virtual excitations arising from electronic interactions. Furthermore, the exponential parametrization captures multiple excitations better than truncated Configuration Interaction calculations of the same order, since the exponential operator accounts for clusters of excitations (e.g., a pair of double excitations contributes to the theoretical amplitude of quadruple excitations).

An initial guess for the coupled cluster amplitudes $t_{a_1\ldots a_\ell}^{b_1\ldots b_\ell}$ may be evaluated using many-body perturbation theory, or the Møller-Plesset method. Using such an initial guess to obtain a family of trial wavefunctions, CC theory develops various algorithms to optimize the parameters and converge to an accurate representation of the ground state wavefunction within the ansatz manifold, by treating the energy expectation value of the trial wavefunction (estimated using the known form of the Hamiltonian) as the objective function to be minimized.

Embodiments of the present invention may divide the tasks involved in the vCC method between a quantum processor and a classical processor. At iteration k, the quantum processor takes as input a set of parameter values $\hat{t}^{(k)} = \vec{t}$ and prepares the CC trial wavefunction $\varphi\psi(\vec{t})\rangle$ using a parametrized circuit $U(\vec{t})$ that implements the exponential of the cluster operator $e^{\hat{T}(\vec{t})}$ to an initial guess $|\Psi_0\rangle$ (e.g., a Slater determinant of the molecular orbital basis chosen for the vCC approximation), and subsequently evaluates the energy expectation value $\langle E\rangle_{\vec{t}}$ of this trial wavefunction by performing efficient partial tomography or Hamiltonian averaging. The classical processor runs an optimization routine that computes a new set of parameter values $\vec{t}^{(k+1)}$, which it passes to the quantum processor. The classical optimization routine treats the energy expectation value passed to it as an objective function to minimize, and uses the quantum processor purely as an oracle for evaluating the function at specified parameter values. This completes one round of the algorithm. Thus, we have the following variational prescription $$|\psi(\vec{t})\rangle = e^{T(\vec{t})}|\Psi_0\rangle \qquad (5)$$

$$E_{vCC} = \min_{\vec{t}} \frac{\langle\psi(\vec{t})|H|\psi(\vec{t})\rangle}{\langle\psi(\vec{t})|\psi(\vec{t})\rangle} \qquad (6)$$

Since we are performing a variational optimization over the ansatz wavefunction, and since normalization is taken care of by virtue of the state being prepared and measured on the quantum processor, embodiments of the present invention obtain a variational method that will give an upper bound on the ground state energy of the input Hamiltonian. The error in the wavefunction, and hence the energy, depends on the choice of basis wavefunctions and the accuracy of the state preparation step.

The state preparation step is described below. Before the method for this step is described, a description is provided of how the fermionic model is mapped onto a qubit model, using the Jordan-Wigner transformation.

The starting point of quantum algorithms for quantum chemistry problems is to represent the fermionic model on a quantum computer, i.e., a system of qubits and quantum gates. There are several ways to encode fermionic systems into spin systems, most of which use the formalism of second quantization. The fermionic Hamiltonian is isospectrally mapped to a Hamiltonian on the system of spins or qubits, enabling the estimation of energy expectation values indirectly through spin measurements.

Since molecular Hamiltonians are unbounded operators acting on infinite dimensional Hilbert spaces, the numerical methods used to approximately solve molecular structure problems always restrict themselves to a finite dimensional subspace, choosing a suitable basis of fermionic modes that spans this approximation subspace. Fermion to qubit mappings encode fermionic states in Fock space or occupation number space into states of a system of qubits, and the target Hamiltonian H acting on m fermionic modes into a simulator Hamiltonian $\tilde{H}$ composed of quantum gates acting on $t=f(m)$ qubits, such that for any isometry V that maps fermionic states to qubit states, we have $VH=\tilde{H}V$. Examples of such encodings include the Jordan-Wigner (JW) transformation, the Bravyi-Kitaev (BK) transformation, and the Verstraete-Cirac mapping. Several newer methods have also been proposed, with advantages in the number of qubits required, the number of qubits on which a transformed fermionic creation or annihilation operator acts non-trivially.

For simplicity, the description herein focuses on the JW transformation to illustrate embodiments of the vCC algorithm for molecular Hamiltonians. This transformation may be modified suitably to work with most of the encodings mentioned above.

The JW transform maps the fermionic creation and annihilation operators $a_p^\dagger$ and $a_q$ onto the spin raising and lowering operators on a chain of qubits. These creation and annihilation (or "ladder") operators in the case of molecular simulations describe the addition or removal of an electron from one of a chosen set of orthonormal molecular basis functions, while the corresponding spin operators describe raising or lowering the spin by one unit. The molecular electrons are indistinguishable, but using the JW transform we can map these onto a string of distinguishable qubits, where qubit j stores the occupation number of orbital j.

The following expressions are obtained for the creation and annihilation operators $$a_j \mapsto 1^{\otimes j-1} \otimes \sigma^+ \otimes (\sigma^z)^{\otimes m-j} \qquad (7)$$

$$a_j^\dagger \mapsto 1^{\otimes j-1} \otimes \sigma^- \otimes (\sigma^z)^{\otimes m-j},$$

where $$\sigma^+ = |0\rangle\langle 1| = \frac{X+iY}{2} \qquad (8)$$

$$\sigma^- = |1\rangle\langle 0| = \frac{X-iY}{2},$$

and $|0\rangle$ and $|1\rangle$ are representing an unoccupied and occupied orbital, respectively.

Applying the JW transform to the cluster operator, the JW transform may be written in the form $$\hat{T}^{(i)} = \sum_{i_1,\ldots,i_n} t_{i_1,\ldots,i_n} \sigma_{i_1}^{\alpha_1} \otimes \cdots \otimes \sigma_{i_n}^{\alpha_n} = \sum_j t_j^{(i)} \hat{T}_j^{(i)}, \qquad (9)$$

where the $\alpha$ superscript may take values in $\{0,z,+,-\}$, representing the (Pauli) operators $\{1,Z,\sigma^+,\sigma^-\}$. The multi-index $j=(i_1,\ldots,i_n)$ may be chosen to subsume all the indices used in the notation introduced for the cluster operator. The number of terms in this linear combination scales polynomially in m and n with the degree being determined by the excitation order at which we truncate.

Using the BK transform, the mapping produces tensor products of Pauli operators that involve only $\mathcal{O}(\log m)$ terms. However, the JW transform will be described as an example herein for ease of exposition, based on recent evidence that the JW transform is more robust to noise on the quantum processor than the BK transform. Embodiments of the present invention, however, are not limited to use with the JW transform.

To prepare CC trial wavefunctions, we need to implement the exponential of this cluster operator, namely $$f(\hat{T}) = e^{\hat{T}} \qquad (10)$$

Although the operators $\hat{T}^{(i)}$ do not commute, the individual Pauli terms do. Furthermore, these terms are nilpotent and square to zero. We can take advantage of this fact to write out a simple expression for the exponential of the cluster operator, as we will see below.

Embodiments of the present invention begin by applying the JW transform to the cluster operator, and expressing it as a sum of tensor products of single-qubit spin operators. Writing $\hat{T}=\Sigma_{ij}t_j^{(i)}\hat{T}_j^{(i)}$ as in Eqn. 9, the following two observations hold true: 1) all Pauli terms $\hat{T}_j^{(i)}$ commute with each other, and 2) each term is nilpotent, with $(\hat{T}_j^{(i)})^2=0$. This follows from the fermionic anticommutation relations, noticing that the commutator between any two terms $\hat{T}_j^{(i)}$ and $\hat{T}_{j'}^{(i')}$ we know that 1) if they contain at least one $a_i$ or $a_j^\dagger$ in common, each term in the commutator becomes zero, and 2) if they share no ladder operators corresponding to the same spin orbitals, the commutator is zero using the anticommutation relations—since there are always an even number of operators in a term, the negative signs that arise from the anticommutation relations will cancel each other out.

Thus, we can write $$e^T = \prod_{ij} e^{t_j^{(i)}\hat{T}_j^{(i)}} = \prod_{ij}\left(1+t_j^{(i)}\hat{T}_j^{(i)}\right), \quad (11)$$

i.e., Trotterisation is exact and the Taylor series truncates at linear order. The total number of terms in this expansion is $M(\ell)$ (see Eqn. 38 below), and scales as $\mathcal{O}(n^\ell(m-n)^\ell)$, which is poly(m,n) for fixed $\ell$. Each term in this product may then be implemented separately using fixed-point oblivious amplitude amplification. Embodiments of the present invention may split each term into several slices to ensure that each slice is close to unitary.

Consider each term in the product above: each $\hat{T}_j^{(i)}$ is an m-fold tensor product of single qubit operators (see Eqn. 40 below). Of these, i are $\sigma_+$ and i are $\sigma_-$ when the excitation order is i (the rest being Z or 1), making $\hat{T}_j^{(i)}$ non-unitary. To proceed further, may be $$\sigma_\pm = \frac{X \pm iY}{2}$$

multiplied to split the tensor product into a sum of $2^{2i}$ terms, each with the same coefficient $2^{-2i}t_j^{(i)}$ This results in $$1+t_j^{(i)}\hat{T}_j^{(i)} = 1 + \frac{t_j^{(i)}}{2^{2i}}\sum_{k=1}^{2^{2i}}\Theta_k^{(i)}, \quad (12)$$

where each $\theta_k^{(i)}$ is now a unitary, specified as a tensor product of the Pauli matrices $\{1,X,Y,Z\}$. This is now in the form of a Linear Combination of Unitaries (LCU). Applying the LCU method to the right-hand side of Eqn. 12, for each $\hat{T}_j^{(i)}$ we get a unitary $U_{ij}$ acting on $2^{2i}+1+m$ qubits. This unitary has the following action on input states $|0^{2^{2i}+1}\rangle|\psi\rangle$ $$U_{ij}|0^{2^{2i}+1}\rangle|\psi\rangle = \frac{1}{1+t_j^{(i)}}|0^{2^{2i}+1}\rangle\left(1+t_j^{(i)}\hat{T}_j^{(i)}\right)|\psi\rangle + |\perp\rangle, \quad (13)$$

where 2i+1 ancillas are needed because there are $2^{2i}+1$ terms, and the sum of coefficients is $1+t_j^{(i)}$. Some of the $\theta_k^{(i)}$ have a factor of $i=e^{i\pi/2}$ coming from the $\sigma_\pm$. This may be dealt with by adding a single ancillary qubit and performing a Y-rotation through $\pi/2$, since $R_y(\pi/2)\otimes\theta_k^{(i)}(|+\rangle|\psi\rangle) = e^{i\pi/2}|+\rangle\otimes\theta_k^{(i)}|\psi\rangle$. By the same argument, phases may always be absorbed to redefine $\theta_k^{(i)}$, and henceforth it is assumed that there will always be real positive amplitudes $t_j^{(i)}>0$.

Measuring the ancillary qubits, if they are all in the $|0\rangle$ state, results in the normalized state $$\frac{\left(1+t_j^{(i)}\hat{T}_j^{(i)}\right)|\psi\rangle}{\left\|\left(1+t_j^{(i)}\hat{T}_j^{(i)}\right)|\psi\rangle\right\|}$$

with success probability $$p_{ij} = \left|\frac{\left\|\left(1+t_j^{(i)}\hat{T}_j^{(i)}\right)|\psi\rangle\right\|}{1+t_j^{(i)}}\right|^2. \quad (14)$$

It may be assumed that, in practice, the initial guess state $|\Psi_0\rangle$ has non-zero overlap with the target ground state. Under this assumption, the numerator is always non-zero.

Embodiments of the present invention may successively apply the $U_{ij}$s corresponding to each of the terms in (11), and relegate post-selection to the last step. However, proceeding in this fashion leads to an exponentially small success probability. To sidestep this issue, embodiments of the present invention may perform each term using fixed-point amplitude amplification (FPOAA).

Each term $$e^{t_j^{(i)}\hat{T}_j^{(i)}} = 1+t_j^{(i)}\hat{T}_j^{(i)}$$

is realized using the corresponding $U_{ij}$, with success probability bounded below by the worst-case value of $1/(1+\tau)^2$, with $$\tau := \max_{ij} t_j^{(i)}.$$

since the probabilities for different terms multiply, the total runtime in the Repeat-Until-Success (RUS) framework will also be multiplicative and can scale exponentially as the number of terms in Eqn. 11, without using amplitude amplification.

Instead, embodiments of the present invention may split each term into a number of segments by the prescription $e^{tA}=(e\eta A)^{t/\eta}$, where $\eta\in(0,1)$ is a small parameter and $r=t/\eta$ is the number of segments (for notational convenience we represent a generic term $t_j^{(i)}\hat{T}_j^{(i)}$ here by tA). Embodiments of the present invention may adjust r such that each segment is $\mathcal{O}(\eta)$-close to a unitary in the spectral norm, satisfying the conditions required for oblivious amplitude amplification, and the parameter $\eta$ will enter into the error analysis for the wavefunction. Now using the FPOAA technique, embodiments of the present invention may implement each segment with success probability 1-ε using $\mathcal{O}(\log(1/\varepsilon)/\log(1/\eta))$ queries. So, for $t/\eta$ segments, embodiments of the present invention may use $$O\left(\frac{t}{\eta} \frac{\log(1/\varepsilon)}{\log(1/\eta)}\right)$$

calls to the LCU unitary for A. The RUS runtime for a single term in Eqn. 11 then scales as $$O\left((1-\varepsilon)^{-\frac{t}{\eta}} \cdot \frac{t}{\eta} \cdot \frac{\log(1/\varepsilon)}{\log(1/\eta)}\right). \quad (15)$$

If $\varepsilon = \eta/t$, then $(1-\varepsilon)^{-t/\eta} = O(1)$ for $\eta/t \ll 1$.

Consider implementing each term successively using the method outlined above. Let $$\tau = \max_{ij} t_j^{(i)}$$

as before. To get the overall complexity, note that the probabilities multiply across all segments and all terms $$e_j^{(i)} \tau_j^{(i)},$$

since we need to discard and re-initialize the LCU ancillary qubits for each segment of each term. Thus, if the probability for each segment is amplified by FPOAA to $1-\in$, the overall success probability becomes $$p \geq (1-\epsilon)^{rM(\ell)},$$

where $r = \tau/\eta$ is the maximum number of segments required for any of the individual terms, and $M(\ell)$ is the total number of such terms (see Eqn. 38 below). Since FPOAA converges monotonically to the target state, the number of segments $r$ may be chosen for the term having the largest coefficient $\tau = t_j^{(i)}$, and fix the same number of segments for all the terms. Now, if $$\epsilon = \frac{1}{rM(\ell)},$$

then $$p \geq (1 - 1/rM(\ell))^{rM(\ell)}.$$

This converges up towards $1/e > 0.36$ as $rM(\ell) \to \infty$, and already for $rM(\ell) = 10$, $p > 0.35$. By choosing $\in = CrM(\ell)$ for some positive integer $C > 1$, the success probability can be made $$p \approx \sqrt[C]{1/e},$$

and for $C=2$, this gives $p \geq 0.6$. Thus, embodiments of the present invention yield a constant success probability greater than $1/2$, and the total number of uses of all the different LCU unitaries $U_{ij}$ for the $M(\ell)$ terms in Eqn. 11 adds up to $$O\left(rM(\ell) \cdot \frac{\log(rM(\ell))}{\log(\tau/r)}\right). \quad (16)$$

To choose $r$, or the equivalent $\eta = \tau/r$, note that the analysis herein is valid if $\eta < 0.5$. Thus, for a given set of parameter values of $\vec{t}$, $r = C\tau$ may be chosen for some constant $C > 2$ and $\tau = \max_{ij} t_j^{(i)}$ as defined previously is the max-norm of the vector of parameters. Henceforth, the term $\log(\tau/r)$ may be dropped from asymptotic expressions.

The above expression may be used to get a precise gate count for the case of finite $m, n, \ell$. For asymptotics, note that $O(n^\ell (m-n)^\ell)$, so that an asymptotic scaling is given by $$\tilde{O}(\tau \ell n^\ell (m-n)^\ell), \quad (17)$$

hiding the logarithmic factor $\log(n(m-n))$ in the $\tilde{O}$ notation, and suppressing the weak $\log \tau$ dependence.

Finally, the gate complexity of the circuit can be obtained by noting that the $\hat{T}_j^{(i)}$ term of excitation order $i$ consists of $2^i$ non-trivial gates, which are one of the three Pauli operators X, Y, and Z. Thus, a simple upper bound on the gate complexity is given by the expression in Eqn. 16 multiplied by the factor $2^\ell$. The actual circuit may be simpler than the gate count indicates, since Z and X gates are easy to implement, and it may be possible to combine terms and reuse circuit segments.

There are several ways to choose single and multireference initial guess states $|\Psi_0\rangle$ using Hartree-Fock or MCSCF calculations as a starting point. For the particular implementation described in FIG. 4, after canonical basis functions are produced using Hartree-Fock the reference state is $$|\underbrace{1 1 \ldots 1}_{n} 0 0 \ldots 0\rangle$$

recalling n being the number of electrons. Embodiments of the present invention may easily prepare this on a quantum computer.

Ground state calculations using the VQE. The first step in using the VQE framework is preparing the ansatz wavefunction on the quantum processor. This may be followed by an efficient estimation of the average energy of this trial wavefunction. Embodiments of the present invention may, for example, use a Hamiltonian averaging procedure to estimate this energy.

The Hamiltonian is mapped by the same isospectral mapping to a qubit operator. For example, this may be in the form of a sum of m-fold tensor products of Pauli operators in the case of the JW transformation $$H = \sum_i h_i O_i, \quad (18)$$

corresponding to the Hamiltonian in Eqn. 2, where the coefficients $h_i$ are the precomputed overlap integrals (matrix elements of the Hamiltonian in the basis chosen for the vCC method). The number of terms in this sum scales as $O(m^4)$ for molecular Hamiltonians, which contain at most two-body interactions. The average energy of the trial wavefunction $|\psi(\vec{t})\rangle$ is given by $$\langle H \rangle_{\vec{t}} := \langle \psi(\vec{t}) | H | \psi(\vec{t}) \rangle = \sum_i h_i \langle O_i \rangle_{\vec{t}}, \quad (19)$$

which may be determined purely by making single qubit spin measurements, each of which have only two outcomes ±1. This in turn means that the variance of each of the observables $O_i$ is bounded by 1. If we make $M_i$ measurements to determine the quantity $\langle O_i \rangle$, the precision to which we can approximate the value of the corresponding term in the Hamiltonian is given by the empirical variance of the mean we estimate, that is $$\epsilon_i^2 = \frac{|h|_i^2 \mathrm{Var}(\langle O_i \rangle)}{M_i} \leq \frac{|h|_i^2}{M_i}. \tag{20}$$

To obtain the total energy to a precision $\in^2$ using a total of $M = \Sigma_i M_i$ measurements (or equivalently, samples), embodiments of the present invention may choose $$M_i = \frac{|h_i|}{\sum_j |h_j|} M, \tag{21}$$

and since the total error in the energy estimated using these measurements is given by the sum of the variances, $\Sigma_i \Sigma_i^2$, this leads to $$M \approx \frac{\left(\sum_i |h_i|\right)^2}{\epsilon^2}, \tag{22}$$

so that the number of measurements, and hence samples of the trial wavefunction, scales quadratically with the inverse precision to which we would like to estimate the energy. While it does require a fairly large number of measurements, this method makes it possible to avoid quantum phase estimation, which requires long coherence times and the use of $\mathcal{O}(\log 1/\in)$ ancillary qubits.

Thus, the net complexity of the part of the embodiments of the present invention that run on the quantum co-processor, including the number of measurements required for Hamiltonian averaging to find the energy expectation value of trial wavefunctions, has an asymptotic scaling of $$\tilde{\mathcal{O}}\left(\frac{1}{\epsilon^2} \cdot \tau \ell m^\ell n^\ell\right),$$

where the factor $(\Sigma_i |h_i|)^2$ has been hidden, which is related to the norm of the input Hamiltonian, and scales as $\mathcal{O}(m^4)$ in the worst case.

The next step in a round of variational quantum optimization is to perform classical optimization over the parameter space of t using the average energy of the trial wavefunction as the objective to minimize. A variety of methods, ranging from stochastic gradient descent to gradient-free direct search methods such as the Nelder-Mead simplex algorithm, may be used for this purpose. The cost of optimization on the classical processor will depend on the dimension of the parameter space, which in the worst-case scales asymptotically as $\mathcal{O}(m^\ell n^\ell)$. Thus, for vCCSD (vCC truncated to single and double excitations), the cost depends on $\mathcal{O}(m^\ell n^\ell)$. In practice, the parameter space may, for example, be pruned by using preprocessing using Møller-Plesset or many body perturbation theory calculations to estimate the cluster amplitudes and remove those terms from the cluster operator that have amplitude below some threshold.

In addition to the number of parameters to optimize, the number of rounds required by the optimization routine to achieve convergence will depend on the quality of the initial guess or reference state. In particular, one can expect it to depend inverse polynomially on the magnitude of the overlap $\beta = \langle \mathrm{tar} | \Psi_0 \rangle$ between the reference state and the true target state, which in the simplest case is the true ground state. This may, for example, be tuned to some extent by choosing suitable reference states, using Hartree-Fock, MP2, MCSCF or other ab-initio techniques. Indeed, unless the reference state has $|\beta| \geq 1/\mathrm{poly}(m,n)$, the optimization cannot be performed in $\mathrm{poly}(m,n)$ time.

As described above, embodiments of the present invention include a quantum algorithm for preparing the exponentially parametrized coupled cluster family of ansatz states from variational quantum chemistry with asymptotic gate complexity $\mathcal{O}(m^\ell n^\ell)$ for a constant excitation order $\ell$. Using a Hamiltonian averaging procedure, the energy expectation value of the trial functions thus prepared may be estimated to precision E using only single qubit spin measurements, and a total of $\mathcal{O}(\Sigma_i h_i|^2/\in^2) = \mathcal{O}(m^4/\in^2)$ e samples. Here the $h_i$ are the matrix elements of the fermionic Hamiltonian in the molecular orbital basis chosen for the vCC approximation, and the loose bound of $\mathcal{O}(m^4)$ is obtained simply by counting the number of terms in the second-quantized Hamiltonian. This is exponentially better than known classical methods of estimating the energy expectation value of the trial wavefunction, which suffer from the usual problem of having to deal with vectors of dimension exponential in m, particularly in the strongly correlated regime where the target state is expected to be highly entangled and delocalised. These results match the performance of other known CC methods.

In the special case of vCC truncated to single and double excitations, vCCSD, the entire quantum algorithm disclosed herein for evaluating the energy expectation value of the trial wavefunction may have a complexity that scales as $\tilde{\mathcal{O}}(m^2 n^2 \cdot 1/\in^2)$.

Embodiments disclosed herein may, for example, be modified in a variety of ways, such as by using multireference initial guess states, and extended coupled cluster techniques that use modified cluster operators and include de-excitation terms.

The Linear Combination of Unitaries (LCU) method is a technique that can be used to probabilistically implement any operator that is decomposed into a linear combination of unitaries, each of which can be implemented.

Given an operator $$A = \sum_{i=1}^{N} t_i \Theta_i,$$

where the $\theta_i$ are unitary, A may be implemented, for example, using the LCU method as follows. First, two unitaries may be constructed, one that performs the controlled operation $$\mathrm{SELECT}(A) = \sum_{j=0}^{N-1} |j\rangle\langle j| \otimes \Theta_j, \tag{23}$$

and one that prepares a control-state, performing the map $$V|0^m\rangle = \frac{1}{\sqrt{\tau}} \sum_{j=0}^{N-1} \sqrt{t_j} |j\rangle, \quad (24)$$

where $\tau = \Sigma_j | t_j |$, and the number of ancillary qubits required is $m = \lceil \log N \rceil$. Then the LCU operator may be defined as $$W = (V^\dagger \otimes 1)\text{SELECT}(A)(V \otimes 1), \quad (25)$$

where the identity part in the first and third terms acts on the system register. The action of W on a state $|\Psi\rangle = |0^m\rangle |\psi\rangle$ is given by $$W|0^m\rangle|\psi\rangle = \frac{1}{\tau}|0^m\rangle A|\Psi\rangle + |\perp\rangle, \quad (26)$$

where $(|0^m\rangle \langle 0^m| \otimes 1)|\perp\rangle = 0$. If we postselect on the ancillary register being in the state $|0^m\rangle$, the output state will be $$|\psi_{out}\rangle = \frac{A|\psi\rangle}{\|A|\psi\rangle\|}, \quad (27)$$

and the probability of success in obtaining this state will be $$p = \left|\frac{\|A|\psi\rangle\|^2}{\tau}\right| \geq \left|\frac{\|A^{-1}\|}{\tau}\right|^2, \quad (28)$$

assuming A is not singular, where by $\|A^{-1}\|$ we mean the least eigenvalue (singular value) of A on the domain of interest. Depending on the setup, different versions of amplitude amplification may be used to boost the success probability using $$O\left(\frac{1}{\sqrt{p}}\right) = O\left(\left|\frac{\tau}{\|A^{-1}\|}\right|\right) \quad (29)$$

repetitions of the LCU operator W. For an efficient implementation, the value of the sum of coefficients T must not be too large, and $\|A^{-1}\|$ must not be too small.

Next, examples of techniques for preparing the control state for the LCU will be described. To implement $T := T_j^{(i)}$ given by:

$$T = 1 + \frac{t}{2^{2i}} \sum_{l=0}^{2^{2i}-1} \Theta_j^{(i)}$$

using the LCU method, we need a control-state preparation unitary that performs the map:

$$V|0\rangle = \frac{1}{\sqrt{1+t}}\left(|0\rangle + \sum_{l=1}^{2^{2i}-1} \sqrt{\alpha} |l\rangle\right),$$

where $t := t_j^{(i)}$ and $$\alpha = \frac{t}{2^{2i}}.$$

Such a unitary can be constructed using known techniques. Consider the probability distribution $p = (p_0, \ldots, p_{2^{2i+1}})$ with:

$$p_0 = \frac{1}{1+t}$$

$$p_i = \frac{\alpha}{1+t} 1 \leq i \leq 2^{2i}$$

$$p_k = 0 \, 2^{2i} + 1 \leq k \leq 2^{2i+1}.$$

This distribution may readily be integrated (in this case, summed up) to obtain the cumulative distribution function, which is required in creating the quantum state corresponding to this p. If $0, \ldots, 2^{2i+1}$ is partitioned into $2^k$ segments of equal size, numbered $0, \ldots, 2^k - 1$, and consider the conditional probability concentrated in the left half of the $l^{th}$ segment, this results in:

$$f_k(0) = \frac{1}{p_{k-1}^0} \cdot \frac{1}{1+t}(1 + (2^{2i-k} - 1)\alpha)$$

$$f_k(l) = \frac{1}{p_{k-1}^l} \cdot \frac{1}{1+t}(2^{2i-k}\alpha) 1 \leq l \leq 2^{k-1} + 1$$

$$f_k(l) = 0 \, 2^{k-1} + 2 \leq l \leq 2^k,$$

where the normalization factors are the segment probabilities from the previous step. Then, embodiments of the present invention may perform the following procedure. The following single qubit state may be prepared:

$$|\psi_1\rangle = (\sqrt{f(0)}|0\rangle + \sqrt{f(1)}|1\rangle),$$

corresponding to dividing the set $0, \ldots, 2^{2i+1}$ into two equal segments. In this case, $$f(0) = 1 - \frac{\alpha}{1+t}$$

and $$f(1) = \frac{\alpha}{1+t}.$$

Embodiments of the present invention may then adjoin an ancilla qubit in the state $|0\rangle$ and, by applying conditional rotations, prepare a state corresponding to $2^2 = 4$ segments. The following conditional single-qubit rotation may be applied:

$$|0\rangle\langle 0| \otimes R_y\left(2\cos^{-1}\sqrt{f_1(0)}\right) + |1\rangle\langle 1| \otimes R_y\left(2\cos^{-1}\sqrt{f_1(1)}\right),$$

where $$R_y(2\cos^{-1}\sqrt{f_k(l)})|0\rangle = \sqrt{f_k(l)}|0\rangle + \sqrt{1-f_k(l)}|1\rangle.$$

At step k, when there is the state corresponding to $2^k$ segments:

$$|\psi_k\rangle = \sum_{l=0}^{2^k-1} \sqrt{p_k^l}\,|l\rangle,$$

where $p_k^l$ is the probability contained in the $l^{th}$ segment, embodiments of the present invention may apply the following conditional rotation to go to step k+1, i.e., to further subdivide into $2^{k+1}$ segments:

$$\sum_{l=0}^{2^i-1} |l\rangle\langle l| \otimes R_y\left(2\cos^{-1}\sqrt{f_k(l)}\right).$$

Thus, for excitation order i, exactly 2i+1 ancillary qubits may be used, and $2^{2i}+1$ non-trivial controlled single-qubit rotations. If embodiments of the present invention truncate at excitation order $\ell$, then the total number of ancillas and controlled rotations is $\mathcal{O}(\ell)$ and $\mathcal{O}(4^\ell)$ respectively.

For CCSD and CCSDT, this corresponds to 5 or 7 ancillae, and 16 or 64 single-qubit rotations per state preparation.

Fixed-point oblivious amplitude amplification (FPOAA), which has recently been investigated, is a method that combines the features of oblivious amplitude amplification and fixed-point quantum search. The advantage of the former is that, unlike traditional amplitude amplification, one does not need to be able to reflect about the entire target state. The fixed-point search algorithm, on the other hand, has the advantage of monotonously converging to the target state, avoiding the overshooting problem of traditional amplitude amplification.

Suppose there is a unitary W which implements an operation $$W|0^m\rangle|\psi\rangle = \alpha|0^m\rangle V|\psi\rangle + \beta|\varphi^\perp\rangle$$

where V is a linear combination of unitaries that is also a unitary. Such a W preserves a 2-dimensional space spanned by $|\varphi\rangle = |0^m\rangle V|\psi\rangle$ and $|\Phi^\perp\rangle$. Let $\Pi = |0^m\rangle\langle 0^m| \otimes 1$ be a projection onto the ancillary part of the target state, and consider the operator $R = 1 - (1-e^{i\pi/3})\Pi$ that applies a selective phase shift. Let $S = WRW^\dagger RW$. Then if $|\alpha|^2 = 1-\epsilon$, one can show that $\|\Pi S|0^m\rangle|\psi\rangle\|^2 = 1 - \epsilon^3$. This probability amplification method can also be constructed recursively, as follows $$S_d = S_{d-1}RS_{d-1}^\dagger RS_{d-1}, \quad S_0 = S, \quad (30)$$

where recursion to depth d decreases the failure probability from $\epsilon$ to $\epsilon^{3^d}$, requiring $$\frac{3^d-1}{2}$$

calls to W. Hence to suppress the failure probability to at most $\epsilon$ from an initial value of $\epsilon_0$, one needs $O(\log \epsilon^{-1}/\log \epsilon_0^{-1})$ calls to W.

Embodiments of the present invention may implement a non-unitary operation $\tilde{V} = I + tT$ using the operation $\tilde{W} = U_{ij}$ in (13). For small t, $\tilde{V}$ is close to unitary and the same procedure as above works, with a suitably modified error analysis. Hence $$\tilde{W}|0^m\rangle|\psi\rangle = \frac{1}{1+t}|0^m\rangle\tilde{V}|\psi\rangle + |\tilde{\Phi}^\perp\rangle \quad (31)$$

where $|\Phi^\perp\rangle$ is some unnormalized state. Let $\tilde{S} = \tilde{W}R\tilde{W}^\dagger R\tilde{W}$. Noticing that the success probability is $$p = \left|\frac{\|\tilde{V}|\psi\rangle\|}{1+t}\right|^2$$

and defining $$|\Phi\rangle = \frac{|0^m\rangle\tilde{V}|\psi\rangle}{\||0^m\rangle\tilde{V}|\psi\rangle\|} \text{ and } |\Phi^\perp\rangle = \frac{|\tilde{\Phi}^\perp\rangle}{\||\tilde{\Phi}^\perp\rangle\|},$$

embodiments of the present invention may take advantage of unitarity to rewrite Eqn. 31 with the states on the right-hand side normalized as $$\tilde{W}|0^m\rangle|\psi\rangle = \sqrt{p}|\Phi\rangle + \sqrt{1-p}|\Phi^\perp\rangle. \quad (32)$$

The result of this, in terms of the normalized states, is $$\tilde{S}|0^m\rangle|\psi\rangle = \tilde{W}R\tilde{W}^\dagger R(\sqrt{p}|\Phi\rangle + \sqrt{1-p}|\Phi^\perp\rangle) \quad (33)$$
$$= \tilde{W}R\tilde{W}^\dagger(e^{i\pi/3}\sqrt{p}|\Phi\rangle + \sqrt{1-p}|\Phi^\perp\rangle)$$
$$= \tilde{W}R[(e^{i\pi/3}-1)\sqrt{p}\,\tilde{W}^\dagger|\Phi\rangle + |0^m\rangle|\psi\rangle]$$
$$= \tilde{W}(I - (1-e^{i\pi/3})\Pi)[(e^{i\pi/3}-1)\sqrt{p}\,\tilde{W}^\dagger|\Phi\rangle + |0^m\rangle|\psi\rangle]$$
$$= (e^{i\pi/3}-1)\sqrt{p}|\Phi\rangle + e^{i\pi/3}\tilde{W}|0^m\rangle|\psi\rangle +$$
$$\sqrt{p}(e^{i\pi/3}-1)^2\tilde{W}\Pi\tilde{W}^\dagger|\Phi\rangle$$

The third step above uses Eqn. 32 to write $|0^m\rangle|\psi\rangle - \sqrt{p}\tilde{W}^\dagger|\Phi\rangle) = 1-p\tilde{W}^\dagger|\Phi^\perp\rangle$. The last term on the last line may be simplified to $$\tilde{W}\Pi\tilde{W}^\dagger|0^m\rangle\tilde{V}|\psi\rangle = p|\Phi\rangle + \sqrt{p(1-p)}|\Phi^\perp\rangle.$$

This results in $$\tilde{S}|0^m\rangle|\psi\rangle = |\Phi\rangle(\sqrt{p}(2e^{i\pi/3}-1) + (\sqrt{p})^3(e^{i\pi/3}-1)^2) + \quad (34)$$
$$|\Phi^\perp\rangle(\sqrt{1-p}\,e^{i\pi/3} + p\sqrt{1-p}(e^{i\pi/3}-1)^2).$$

The failure probability, or probability of obtaining a measurement result in the non-target subspace, is given by $$p' = |\sqrt{1-p}\,e^{i\pi/3} + p\sqrt{1-p}(e^{i\pi/3}-1)^2|^2 = (1-p)^3, \quad (35)$$

which shows that the failure probability falls from 1-p to $(1-p)^3$.

Furthermore, $$p \geq \frac{1}{(1+t)^2} \geq 1 - 2t$$

for t<1/2. Therefore, the initial failure probability $\varepsilon_0$<2t, and the total number of calls to W required to suppress the failure probability down to $\varepsilon$ scales as $O(\log(1/\varepsilon)/\log(1/t))$.

For an n-electron system, and a basis $\mathcal{B}=\mathcal{B}_O \cup \mathcal{B}_u$ consisting of a total of m single particle orbitals, of which $|\mathcal{B}_O|=n$ are occupied and $|\mathcal{B}_u|=m-n$ are unoccupied, the cluster operator term of excitation order j has the form $$\hat{T}^{(j)} = \frac{1}{(j!)^2} \sum_{i_1,\ldots,i_j \in \mathcal{B}_O} \sum_{\alpha_1,\ldots\alpha_j \in \mathcal{B}_u} t^{i_1 i_2 \ldots i_j}_{\alpha_1 \alpha_2 \ldots \alpha_j} a^\dagger_{\alpha_1} a^\dagger_{\alpha_2} \ldots a^\dagger_{\alpha_j} a_{i_j} a_{i_{j-1}} \ldots a_{i_1}. \quad (36)$$

Since there are j creation and annihilation operators each, corresponding to the occupied and unoccupied single particle basis states, the total number of terms in this sum is given by (neglecting constant factors that may arise due to normal ordering)

$$M_j := \mathrm{Num}(\hat{T}^{(j)}) = \binom{n}{j}\binom{m-n}{j} = O(n^j (m-n)^i). \quad (37)$$

If these are summed up for excitations up to order $\ell$, the result is $$M(\ell) := \sum_{i=0}^{\ell} \binom{n}{i}\binom{m-n}{i} = \frac{\Gamma(m+1)}{\Gamma(n+1)\Gamma(m-n+1)} - \binom{n}{\ell+1}\binom{m-n}{\ell+1}{}_3F_2(1,\ell-n+1,\ell-m+n+1;\ell+2,\ell+2;1), \quad (38)$$

where $_3F_2$ is a generalised hypergeometric function.

Although asymptotically the number of terms scales as $\mathcal{O}(n^\ell (m-n)^\ell)$, the polynomial that is hiding under the highest degree term has a large number of terms and potentially large coefficients. For practical purposes, it would also be useful to know an exact gate count.

Furthermore, note that the number of terms also equals the number of independent parameters that have to be optimized over by the classical optimization routine in the VQE procedure.

One ingredient that embodiments of the present invention may use in preparing CC ansatz wavefunctions using the LCU method is the expansion of the JW transformed cluster operator as a linear combination of tensor products of single qubit Pauli operators, or "Pauli strings."

Consider $\hat{T}=\Sigma_i \hat{T}^{(i)}=\Sigma_{i,j}\hat{T}_j^{(i)}$, in which the upper index represents excitation order. The lower index runs from 1, ..., $M_i$ for $M_i$ from Eqn. 37 and labels an ordered pair of multi-indices $(\vec{b}, \vec{\alpha})$ which are both i-tuplets ordered so that $b_1<b_2<\ldots<b_i<\alpha_1<\alpha_2<\ldots<\alpha_i$, where $1 \leq b_k \leq n$ and $n<\alpha_k \leq m$ for all $1 \leq k \leq i$. The operator $\hat{T}^{(i)}$ may be written as $$\hat{T}^{(i)} = \sum_{j=1}^{M_i} T_j^{(i)} = \sum_{\substack{b_1<b_2<\ldots<b_i \\ \forall k\, b_k \in \mathcal{B}_O}} \sum_{\substack{\alpha_1<\alpha_2<\ldots<\alpha_i \\ \forall k\, \alpha_k \in \mathcal{B}_u}} t^{\vec{b}}_{\vec{\alpha}} a^\dagger_{b_1} a^\dagger_{b_2} \ldots a^\dagger_{b_i} a_{\alpha_i} a_{\alpha_{i-1}} \ldots a_{\alpha_1}. \quad (39)$$

Now applying the JW transform (see Eqn. 7) for each of the $a, a^\dagger$ terms and using $Z\sigma_\pm = \pm \sigma_\pm$ etc., the result is $$\hat{T}_j^{(i)} = 1^{\otimes b_1 - 1} \otimes \sigma_- \otimes Z^{\otimes b_2 - b_1 - 1} \otimes \quad (40)$$
$$(-\sigma_-) \otimes 1^{\otimes b_3 - b_2 - 1} \otimes \ldots \otimes (Z^{i-1}\sigma_-) \otimes$$
$$\begin{cases} Z^{\otimes \alpha_1 - b_i - 1} \otimes \sigma_+ \otimes 1^{\otimes \alpha_2 - \alpha_1 - 1} \otimes \sigma_+ \otimes \ldots \otimes \sigma_+ \otimes 1^{m - \alpha_i}, & i \\ 1^{\otimes \alpha_1 - b_i - 1} \otimes \sigma_+ \otimes Z^{\otimes \alpha_2 - \alpha_1 - 1} \otimes \sigma_+ \otimes \ldots \otimes \sigma_+ \otimes 1^{m - \alpha_i}, & i \end{cases}$$

Note that the Pauli string $\vec{T}_j^{(i)}$ may further be indexed by an m-bit binary string—simply by representing both $\sigma_\pm$ by 1 and both 1 and Z by 0. Then it is known that:
if the string has Hamming weight 2i, then i of the 1s must appear within the first n places, and the remaining i in the last m–n places;
the first i instances of 1 correspond to $\sigma^-$ (i.e., to the creation operators $a^\dagger_{b_k}$) and the subsequent i 1s correspond to $\sigma_+$ (i.e., to the annihilation operators $a_{\alpha_k}$);
there can be at most 2n positions with a 1.

Furthermore, the mapping $f: \otimes_{i=1}^m \sigma_i \to \cup_{i=1}^n S_{2i}, \subset \{0,1\}^m$ of strings of the form of Eqn. 40 into m-bit binary strings of even weight up to 2n gives a way to order the terms within each excitation order $\hat{T}^{(i)}$, or to order all terms within $\hat{T}$ as a whole, whichever we choose to do. That is, a natural family of indexing functions is obtained by setting $\mathcal{I}_j$: $f(\hat{T}_j^{(i)})=f_1 \ldots f_m \mapsto k \in [M_i,]$ if the m-bit string f of weight 2i represents in binary the $k^{th}$ smallest integer in the list of weight 2i strings allowed under the rules described above.

Alternatively, a function $\mathcal{I}$ may be obtained that simply sorts all the strings allowed by the above rules (across all weights) in ascending order, assigning a string the integer corresponding to its position in the sorted list. These indexing functions and their inverses are efficiently computable in time $\mathcal{O}(\mathrm{poly}(m,n))$. For example, by using the [n][m-n] structure of the Hamming weight 2i strings, the operator can be reconstructed from the corresponding bit string on the fly.

Figure 4:
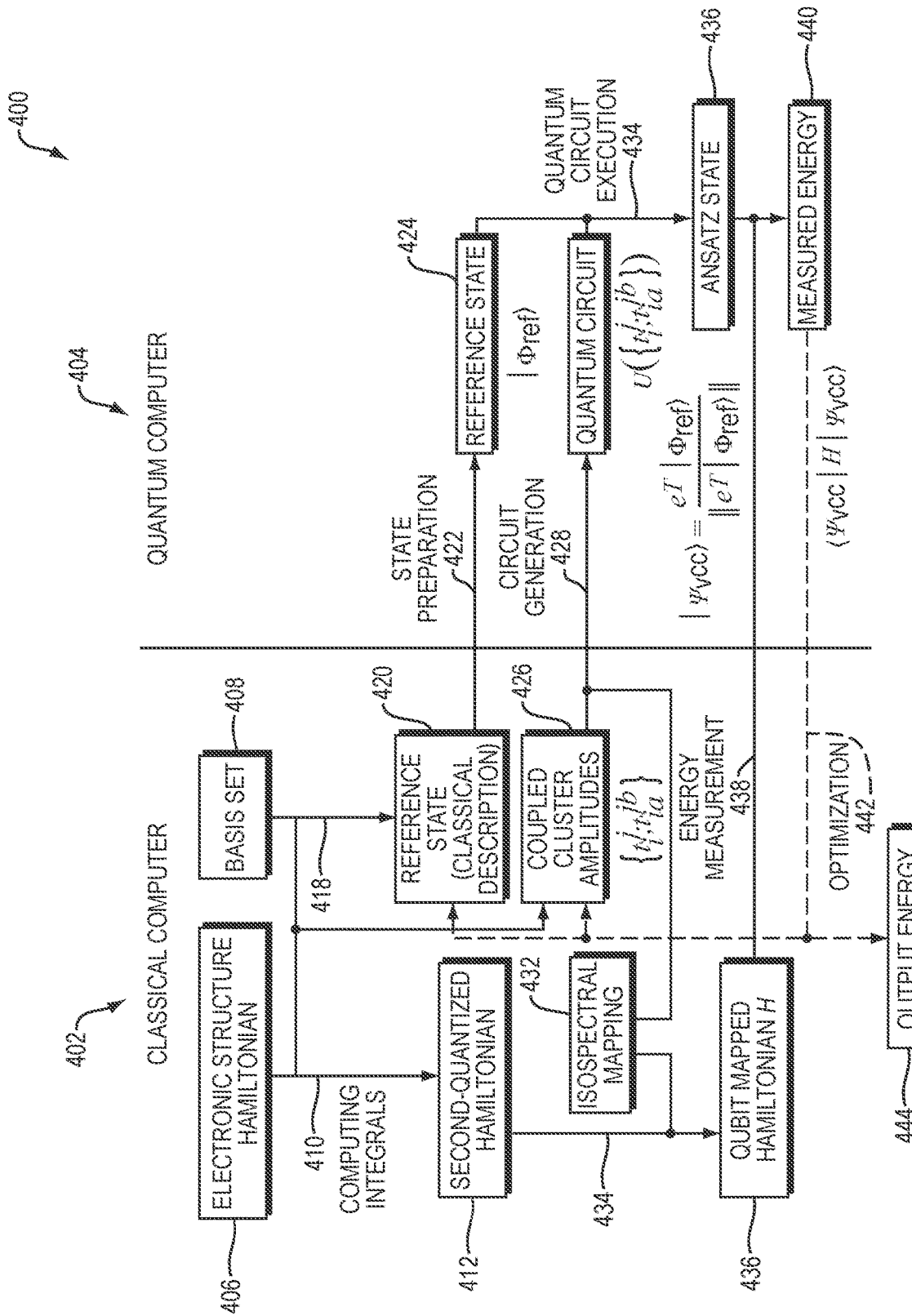
FIG. 4 is a diagram of a hybrid quantum-classical (HQC) computer implemented according to one embodiment of the present invention for realizing a variational quantum eigensolver (VQE) with vCC ansatz.

A HQC 400 according to one embodiment of the present invention is shown in FIG. 4. In general, the HQC 400 realizes a variational quantum eigensolver (VQE) with vCC ansatz, as will now be described in more detail. The HQC 400 includes both a classical computer 402 and a quantum computer 404.

For a quantum mechanical problem involving n interacting electrons, one typically considers an electronic structure Hamiltonian H of the form:

$$H = \sum_{i=1}^{n} T_i + U_i + \sum_{i,j, i \neq j} V_{ij} \quad (41)$$

where $$T_i = \frac{1}{2}\nabla_i$$

and $U_i$ are the Kinetic and potential energies of each electron, respectively, and $$V_{i,j} = \frac{1}{|r_i - r_j|}$$

is the Coulomb interaction energy between electron i at coordinate $r_i$ and electron j at coordinate $r_j$. Hence, the electronic structure Hamiltonian H is a continuous operator acting on the coordinate space r. The spectrum of H in most cases is beyond analytical solution. One general method for approximating the spectrum of H is to introduce a set of orthonormal basis functions $$\left\{ \psi_{i,s}(r), i=1, \ldots, \frac{N}{2}, s=-1, 1 \middle| \sum_{s \in \{-1,1\}} \int \psi_{i,s}^*(r) \psi_{j,s}(r) dr = \delta_{i,j} \right\} \quad (42)$$

where for each function $\psi_{i,s}$ the index i labels the spatial degree of freedom and s labels the spin degree of freedom. Here the integer N is assumed to be even. The set of functions in Eqn. 42 is called a basis set and each element of the set is a spin orbital. For simplifying the notation from here on, we will use i, j, etc., to index combined spatial and spin degrees of freedom. The basis set in Eqn. 102 then becomes $\{\psi_i\}$. for i=1 to N. The introduction of a basis set allows one to discretize the problem. By introducing ladder operators $\{a_i, a_i^\dagger, i=1, \ldots, N\}$ satisfying fermionic commutation relationship $\{a_i, a_j^\dagger\} \equiv a_i a_j^\dagger + a_j^\dagger a_i = \delta_{i,j} 1$, $\{a_i^\dagger, a_j^\dagger\} = \{a_i, a_j\} = 0$, $\{a_i^\dagger, a_j^\dagger\} = \{a_i, a_j\} = 0$ we can transform the Hamiltonian in Eqn. 1 into a second-quantized form:

$$H = \sum_{pq} h_{pq} a_p^\dagger a_q + \sum_{pqrs} h_{pqrs} a_p^\dagger a_q^\dagger a_r a_s, \quad (43)$$

where the coefficients $h_{pq}$ and $h_{pqrs}$ are one-electron and two-electron integrals which can be computed efficiently classically.

In one construction, the classical computer 402 of FIG. 4 includes a first Hamiltonian 406, also referred to herein as an "electronic structure Hamiltonian." The memory of the classical computer 402 also include data 408 representing a basis set, defined by Eqn. 42 above. The classical computer 402 transforms 410 the first Hamiltonian 406 into a second-quantized Hamiltonian 412, as shown in Eqn. 43 above.

The classical computer 402 then transforms the Hamiltonian 412 into a form that is more amenable for measurements on the quantum computer 404. The classical computer 402 does this by transforming 414 the Hamiltonian 412 into a linear combination of tensor products of Pauli operators:

$$H = \sum_{pq} h_{pq} O_{pq} + \sum_{pqrs} h_{pqrs} O_{pqrs} = \sum_i h_i H_i, \quad (44)$$

where each operator $O_{pq}$ and $O_{pqrs}$ are sums of N-fold tensor products of operators from {I,X,Y,Z} that are mapped from $a_p^\dagger a_q$ and $a_p^\dagger a_q^\dagger a_r a_s$, respectively, under the isospectral transformation. In the second equality, we use an index i to go over all such n-fold tensor products of Pauli operators $H_i$, representing the Hamiltonian H as a weighted sum of such terms. The result is a qubit-mapped Hamiltonian 416.

The classical computer 402 generates 418 a reference state 420 based on the first Hamiltonian 406 and the basis set 408. The classical computer 402 prepares 422 a reference state 424 on the quantum computer 404 based on the reference state 420 on the classical computer 402. Optionally, output 444 from measured energy 440 may also be provided as an input to reference state 420, as illustrated in FIG. 4.

The classical computer 402 generates coupled cluster amplitudes 426 (such as by using many-body perturbation theory, as shown in FIG. 4), which form the set of parameters that are tuned by the classical algorithms executed by the classical computer to minimize the energy expectation with respect to the Hamiltonian 416. The classical computer 402 generates 428 a quantum circuit 430 on the quantum computer 404 using the coupled cluster amplitudes 426 as parameters, such as by using Eqn. 48 (see below). The form of the operators $O_i$ in Eqn. 47 depends on the isospectral mapping 432. In another construction, the isospectral mapping 432 is disposed in the location of arrow 414 between second-quantized Hamiltonian 412 and qubit-mapped Hamiltonian 416.

The quantum computer 404 executes 434 the quantum circuit 430 to prepare an ansatz state 436, such as by using Eqn. 49 (see below). The quantum computer 404 measures 438 the energy of the ansatz state 436, thereby producing a quantum energy measurement 440, such as by using Eqn. 45. The classical computer 402 converts 442 the quantum energy measurement 440 into a form suitable for storage on the classical computer 402, where the energy measurement takes the form of output energy 444 upon convergence of the optimization algorithm 442.

The above construction depicted in FIG. 4 may also be expressed as a framework of variational quantum eigensolver (VQE) using noisy intermediate scale quantum devices in conjunction with a classical computer for approximately preparing the ground state of quantum Hamiltonians (of the form in Eqn. 44 above) as well as approximately measuring the ground state energy.

The basic idea is to use a parametrized quantum circuit $U(\theta)$ to prepare an ansatz state $|\psi_{ansatz}\rangle = U(\theta)|\Phi_{ref}\rangle$ from a reference state $|\Phi_{ref}\rangle$. To approximate the ground state of a Hamiltonian H, one uses a classical computer to optimize $\theta$ such that it minimizes energy of H:

$$\langle \psi_{ansatz}(\theta) | H | \psi_{ansatz}(\theta) \rangle = \Sigma_i h_i \langle \psi_{ansatz}(\theta) | H_i | \psi_{ansatz}(\theta) \rangle \quad (45)$$

measured with respect to the ansatz state.

A reference state $|\Phi_{ref}\rangle$ is suitable to be prepared on a quantum computer because it is a computational basis state (i.e., a product state where each qubit is either in $|0\rangle$ or $|1\rangle$). The choice for ansatz state should be one which is likely beyond efficient classical computation, such as unitary coupled cluster: $|\psi_{uCC}\rangle = \exp(T-T^\dagger)|\Phi_{ref}\rangle$. Here, the cluster operator T is defined with a preexisting partition of spin orbitals in the reference state into those that are occupied by an electron (or equivalently the corresponding qubit is $|1\rangle$, the set of which is labeled as occ) and those that are not occupied by an electron (or equivalently the corresponding qubit is $|0\rangle$, the set of which is labeled as virt for "virtual orbitals"). The operator T is then written as a weighted combination of different levels of excitations from occupied spin orbitals to virtual spin orbitals:

$$T = T_1 + T_2 + \ldots \qquad (46)$$
$$= \sum_{\substack{i \in occ, \\ a \in virt}} t_i^a a_a^\dagger a_i + \sum_{\substack{i,j \in occ, \\ a,b \in virt}} t_{ij}^{ab} a_a^\dagger a_b^\dagger a_i a_j + \ldots .$$

Here, $T_1$ captures all single excitations (i.e., excitations of a single electron from spin orbital i to a), $T_2$ captures all double excitations (i.e., excitations of two electrons from spin orbitals i and j to a and b), etc. The coefficients to and $t_j^a$ and $t_{ij}^{ab}$ are coupled cluster amplitudes for single and double excitations, respectively. In both the uCC setting and the setting using vCC ansatz that is discussed here, these amplitudes form the set θ of parameters that are tuned by the classical algorithms to minimize the energy expectation with respect to the Hamiltonian.

The isospectral transformation which maps the Hamiltonian H from Eqns. 43 and 44 above can also be applied to the cluster operator T in Eqn. 46, producing an operator of the form:

$$T = \sum_{\substack{i \in occ, \\ a \in virt}} t_i^a O_i^a + \sum_{\substack{i,j \in occ, \\ a,b \in virt}} t_{ij}^{ab} O_{ij}^{ab} + \ldots = \sum_i t_i O_i \qquad (47)$$

where each operator $0_{ai}$ and $0_{abij}$ has the same definition as in Eqn. 44. Because the set occ of occupied orbitals and the set virt of virtual orbitals are by definition disjoint and the isospectral transformation preserves the fermionic commutation relationship, all of the operators in $\{O_i^a, O_{ij}^{ab}, \ldots\}$ pairwise commute with each other. In the second equality in Eqn. 47 groups all of the indexing in $\{O_i^a, O_{ij}^{ab}, \ldots\}$ under one index i for simplifying notation. A crucial distinction between the grouping here from Eqn. 44 is that while each $H_L$ in Eqn. 44 is an N-fold tensor product of operators from $\{I,X,Y,Z\}$, each $O_i$ is an element of the set $\{O_i^a, O_{ij}^{ab}, \ldots\}$, which could be a linear combination of N-fold tensor products of operators from $\{I,X,Y,Z\}$.

Since all of the $O_i$ operators commute pairwise, and $O_i^2=0$, it is observed that for any positive integer r $$\exp(T) = \left[\exp\left(\frac{1}{r}T\right)\right]^r = \left[\prod_i \exp\left(\frac{t_i}{r}O_i\right)\right]^r = \left[\prod_i \left(I + \frac{t_i}{r}O_i\right)\right]^r. \qquad (108)$$

Hence, to prepare the vCC ansatz state $$|\psi_{vCC}\rangle = \frac{\exp(T)|\Phi_{ref}\rangle}{\|\exp(T)|\Phi_{ref}\rangle\|}, \qquad (109)$$

one needs to consider implementation of each non-unitary operation $$I + \frac{t_i}{r}O_i$$

in Eqn. 48. The parameter r can be chosen such that $$I + \frac{t_i}{r}O_i$$

is arbitrarily close to identity. Then $$I + \frac{t_i}{r}O_i$$

could be realized probabilistically using well established techniques for approximately implementing linear combination of unitaries (LCU).

Figure 5:
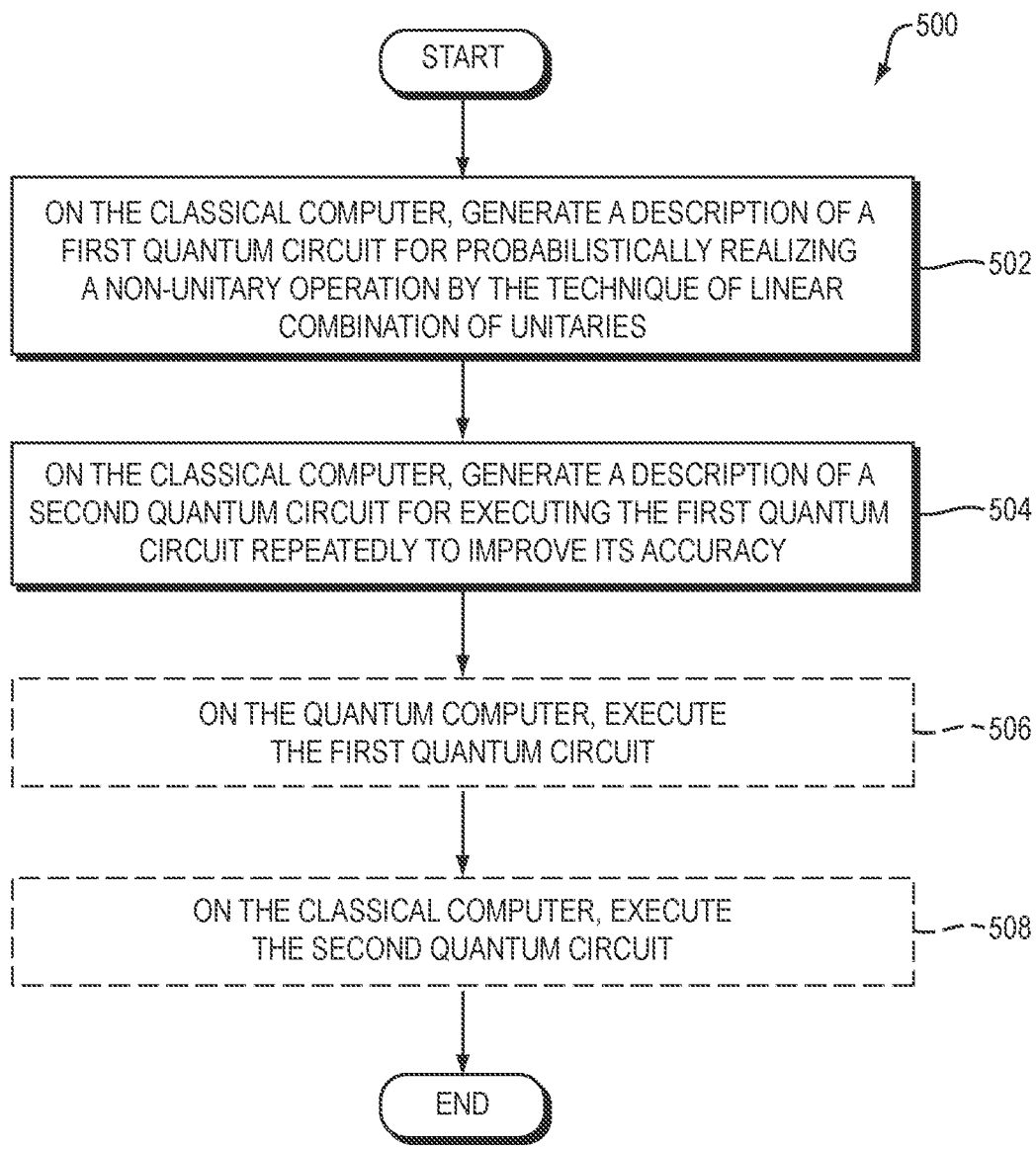
FIG. 5 is a flowchart of a method performed by the HQC computer of FIG. 4 according to one embodiment of the present invention.

Referring to FIG. 5, a flowchart is shown of a method 500 performed by the system 400 of FIG. 4 according to one embodiment of the present invention. In general, the method implements, on the quantum computer 404, a non-unitary operation of the form I+αU, where I is the identity operator, α is a scalar, and U is a unitary operator. The quantum computer 404 includes a plurality of qubits, including an ancilla qubit. The classical computer 402 includes a processor, a non-transitory computer-readable medium, and computer program instructions stored in the non-transitory computer-readable medium. The computer program instructions are executable by the processor to perform the method 500. The method includes: generating and storing, in the non-transitory computer-readable medium of the classical computer 402, computer-readable data representing a description of a first quantum circuit W which, when executed by the quantum computer 404, probabilistically realizes the non-unitary operation by the technique of linear combination of unitaries (FIG. 5, operation 502); generating and storing, in the non-transitory computer-readable medium of the classical computer 402, computer-readable data representing a description of a second quantum circuit, the second quantum circuit comprising a sequence of quantum gates $S_d=S_{d-1}RS_{d-1}^\dagger RS_{d-1}$ parametrized by an integer d, wherein $S_0=WRW^\dagger RW$ and wherein R=

$$\begin{pmatrix} 1 & 0 \\ 0 & e^{i\pi/3} \end{pmatrix}$$

is a single-qubit rotation applied to the ancilla qubit (FIG. 5, operation 504).

The method 500 may further include: on the quantum computer 404, executing the first quantum circuit to probabilistically realize the non-unitary operation by the technique of linear combination of unitaries (FIG. 5, operation 506). The method may further include: on the quantum computer 404, executing the second quantum circuit, comprising executing the sequence of quantum gates $S_d=S_{d-1}RS_{d-1}^\dagger RS_{d-1}$ (FIG. 5, operation 508).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a $2^n \times 2^n$ complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
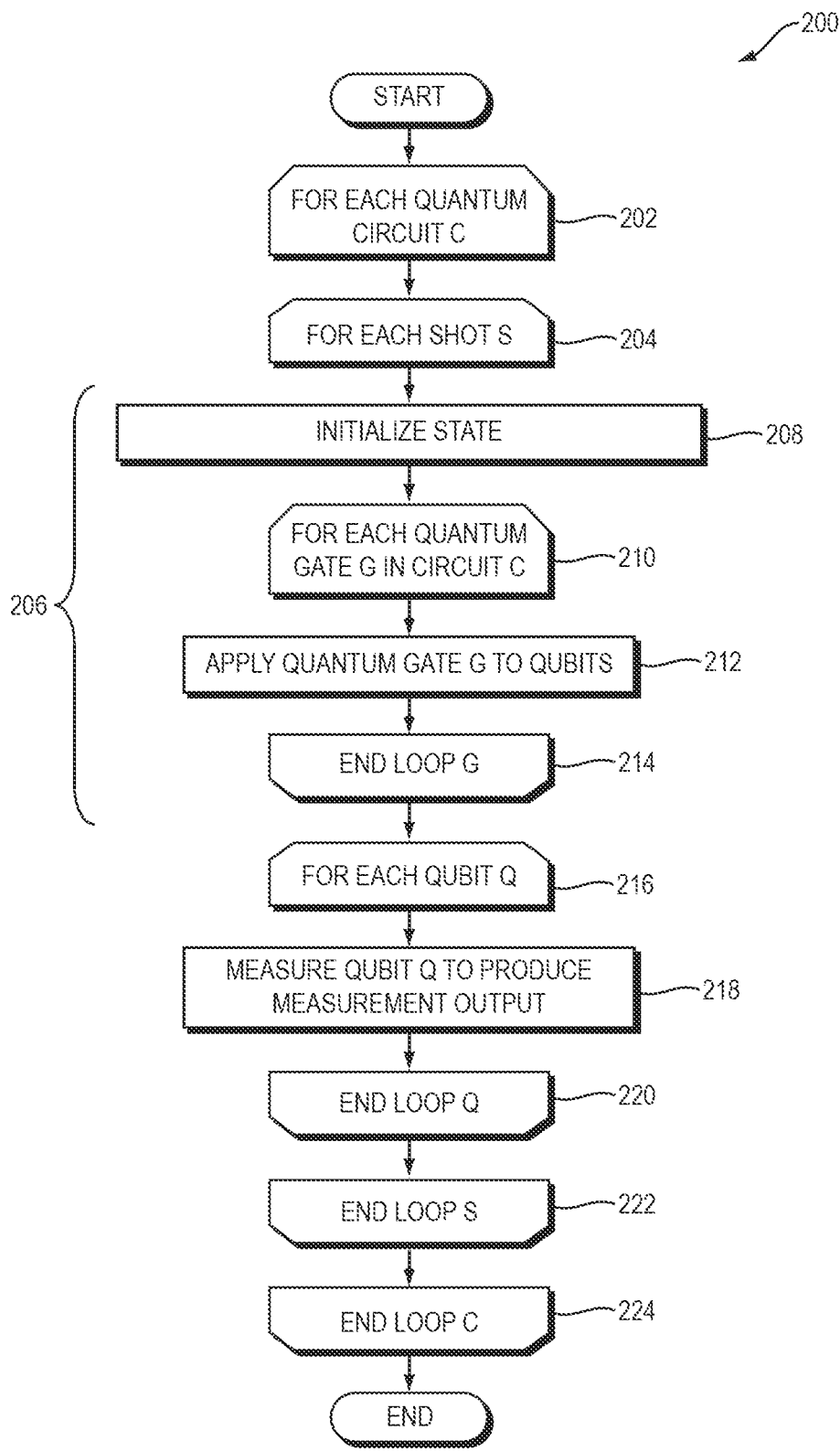
FIG. 2A shows a flow chart of a method performed by the system of FIG. 1 according to one embodiment of the present invention.
Figure 2B:
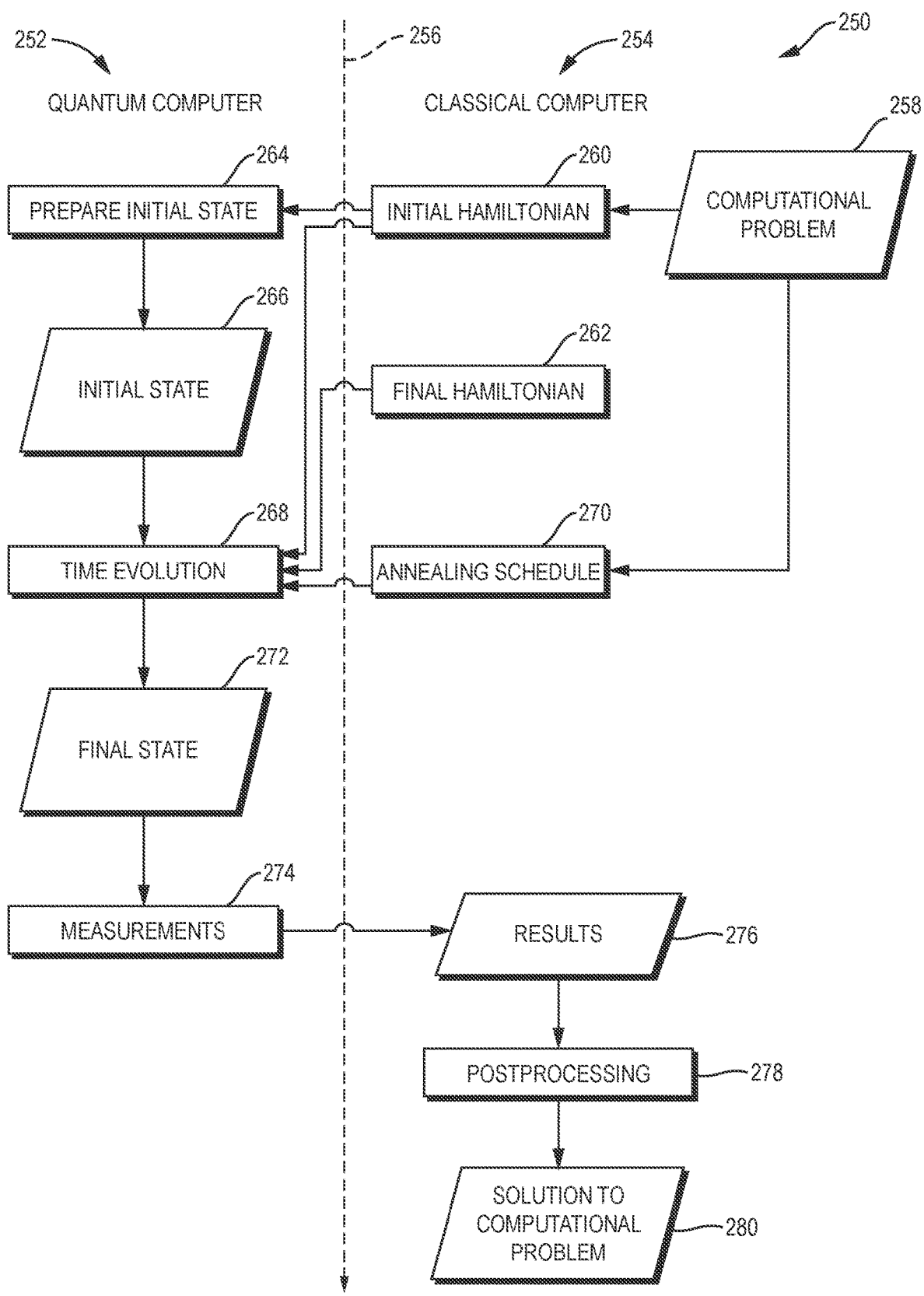
FIG. 2B shows a diagram illustrating operations typically performed by a computer system which implements quantum annealing.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical time evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signal 114 from the measurement unit 110 to the control unit 106. Such feedback signal 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. W and X as elements of "state preparation" may instead be characterized as elements of gate application. Conversely, for example, some or all of the components and operations that are illustrated in FIGS. W and X as elements of "gate application" may instead be characterized as elements of state preparation. As one particular example, the system and method of FIGS. W and X may be characterized as solely performing state preparation followed by measurement, without any gate application, where the elements that are described herein as being part of gate application are instead considered to be part of state preparation. Conversely, for example, the system and method of FIGS. W and X may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
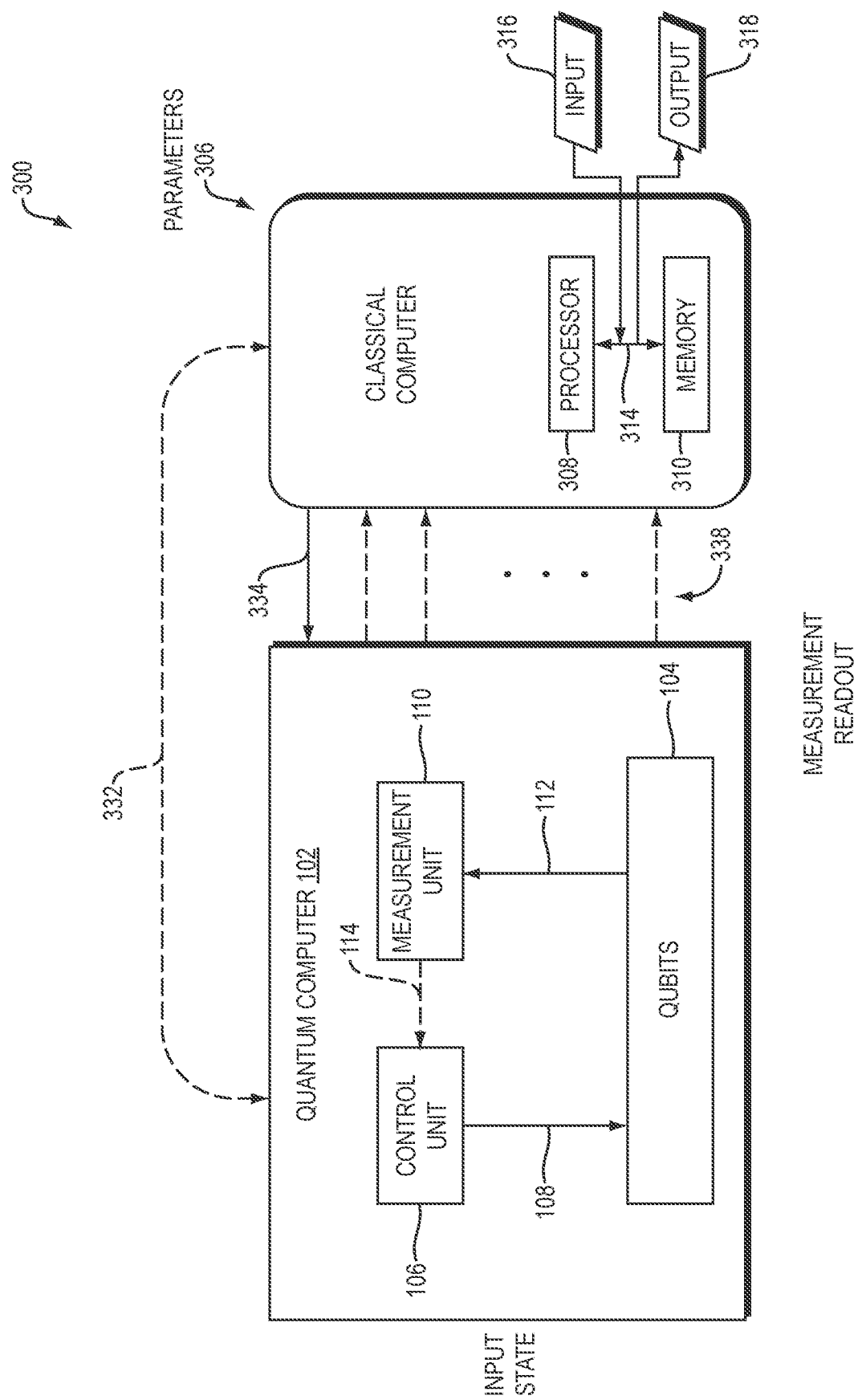
FIG. 3 shows a diagram of a HQC computer system implemented according to one embodiment of the present invention.

Referring to FIG. 3, a diagram is shown of a hybrid quantum classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2.

Once the qubits 104 have been prepared, the classical processor 308 may provide classical control signals 334 to the quantum computer 102, in response to which the quantum computer 102 may apply the gate operations specified by the control signals 108 to the qubits 104, as a result of which the qubits 104 arrive at a final state. The measurement unit 110 in the quantum computer 102 (which may be implemented as described above in connection with FIGS. 1 and 2) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the quantum circuit execution described herein as being performed by a quantum computer, which performs quantum operations on quantum states, which for moderately large systems (e.g., at least 50 qubits) would be infeasible or impossible to perform manually or even using a classical computer.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

The invention claimed is:

1. A method performed by a classical computer for implementing, on a quantum computer, a non-unitary operation of the form I+aU, where I is the identity operator, $\alpha$ is a scalar, and U is a unitary operator, the quantum computer having a plurality of qubits, including an ancilla qubit, the classical computer including a processor, a non-transitory computer-readable medium, and computer program instructions stored in the non-transitory computer-readable medium, the computer program instructions being executable by the processor to perform the method, the method comprising:

(A) generating and storing, in the non-transitory computer-readable medium, computer-readable data representing a description of a first quantum circuit W which, when executed by the quantum computer, probabilistically realizes the non-unitary operation by the technique of linear combination of unitaries;

(B) generating and storing, in the non-transitory computer-readable medium, computer-readable data representing a description of a second quantum circuit, the second quantum circuit comprising a sequence of quantum gates $S_d = S_{d-1} R S_{d-1}^\dagger R S_{d-1}$ parametrized by an integer d, wherein $S_0 = WRW^\dagger RW$ and wherein $$R = \begin{pmatrix} 1 & 0 \\ 0 & e^{i\pi/3} \end{pmatrix}$$

is a single-qubit rotation applied to the ancilla qubit.

2. The method of claim 1, further comprising:

(C) on the quantum computer, executing the first quantum circuit to probabilistically realize the non-unitary operation by the technique of linear combination of unitaries.

3. The method of claim 2, further comprising:

(D) on the quantum computer, executing the second quantum circuit, comprising executing the sequence of quantum gates $S_d = S_{d-1} R S_{d-1}^\dagger R S_{d-1}$.

4. The method of claim 3, wherein (D) comprises, on the quantum computer:

(D)(1) applying a single-qubit rotation $R_\alpha$ to transform the ancilla qubit into the state $$\frac{1}{\sqrt{1+\alpha}}|0\rangle + \sqrt{\frac{\alpha}{1+\alpha}}|1\rangle;$$

(D)(2) applying controlled-U operator on a subset of the plurality of qubits, not including the ancilla qubit, conditioned on the ancilla qubit being in the state $|1\rangle$; and (D)(3) applying $R_\alpha^\dagger$ on the ancilla qubit.

5. The method of claim 1, further comprising generating and storing, in the non-transitory computer-readable medium, additional computer-readable data that, when executed on the quantum computer, causes the second quantum circuit to execute repeatedly, on the quantum computer, to perform a sequence of operations $$\prod_{i=1}^{r} \prod_{j=1}^{k} \left(1 + \frac{\iota \kappa_j}{r} P_j\right),$$

that approximates the operator $e^{tT(\vec{\kappa})}$ with t being a scalar and $$T(\vec{\kappa}) = \sum_{j=1}^{k} \kappa_j P_j$$

being the cluster operator which is a linear combination of operators $P_j$ parametrized by weights $\vec{\kappa}$.

6. The method of claim 5, further comprising:

(C) performing mean-field approximation to generate and store, in the non-transitory computer-readable medium, computer-readable data representing a description of a third quantum circuit to prepare a reference state;

(D) generating and storing, in the non-transitory computer-readable medium, computer-readable data representing a description of a parametrized quantum circuit for approximating $e^{tT(\vec{\kappa})}$;

(E) on the quantum computer, executing the third quantum circuit to prepare the reference state;

(F) on the quantum computer, applying the parametrized quantum circuit to the reference state to generate the ansatz state $|\psi(\vec{\kappa})\rangle$;

(G) using the classical computer in cooperation with the quantum computer to measure an energy of the ansatz $|\psi(\vec{\kappa})\rangle$; and (H) on the classical computer, iteratively tuning the parameters $\vec{\kappa}$ is to minimize the energy of the ansatz $|\psi(\vec{\kappa})\rangle$.

7. A system comprising:

a classical computer the classical computer including a processor, a non-transitory computer-readable medium, and computer program instructions stored in the non-transitory computer-readable medium;

a quantum computer comprising a plurality of qubits, including an ancilla qubit;

wherein the computer program instructions, when executed by the processor, perform a method for implementing, on the quantum computer, a non-unitary operation of the form I+aU, where I is the identity operator, α is a scalar, and U is a unitary operator, the method comprising:

(A) generating and storing, in the non-transitory computer-readable medium, computer-readable data representing a description of a first quantum circuit W which, when executed by the quantum computer, probabilistically realizes the non-unitary operation by the technique of linear combination of unitaries;

(B) generating and storing, in the non-transitory computer-readable medium, computer-readable data representing a description of a second quantum circuit, the second quantum circuit comprising a sequence of quantum gates $S_d = S_{d-1} R S_{d-1}^\dagger R S_{d-1}$ parametrized by an integer d, wherein $S_0 = WRW^\dagger RW$ and wherein $$R = \begin{pmatrix} 1 & 0 \\ 0 & e^{i\pi/3} \end{pmatrix}$$

is a single-qubit rotation applied to the ancilla qubit.

8. The system of claim 7, wherein the method further comprises:
(C) on the quantum computer, executing the first quantum circuit to probabilistically realize the non-unitary operation by the technique of linear combination of unitaries.

9. The system of claim 8, wherein the method further comprises:
(D) on the quantum computer, executing the second quantum circuit, comprising executing the sequence of quantum gates $S_d = S_{d-1} R S_{d-1}^\dagger R S_{d-1}$.

10. The system of claim 9, wherein (D) comprises, on the quantum computer:
(D)(1) applying a single-qubit rotation $R_a$ to transform the ancilla qubit into the state $$\frac{1}{\sqrt{1+\alpha}}|0\rangle + \sqrt{\frac{\alpha}{1+\alpha}}|1\rangle;$$

(D)(2) applying controlled-U operator on a subset of the plurality of qubits, not including the ancilla qubit, conditioned on the ancilla qubit being in the state $|1\rangle$; and
(D)(3) applying $R_\alpha^\dagger$ on the ancilla qubit.

11. The system of claim 7, wherein the method further comprises generating and storing, in the non-transitory computer-readable medium, additional computer-readable data that, when executed on the quantum computer, causes the second quantum circuit to execute repeatedly, on the quantum computer, to perform a sequence of operations $$\prod_{i=1}^{r} \prod_{j=1}^{k} \left(1 + \frac{\iota \kappa_j}{r} P_j\right),$$

that approximates the operator $e^{\iota T(\vec{\kappa})}$ with t being a scalar and $$T(\vec{\kappa}) = \sum_{j=1}^{k} \kappa_j P_j$$

being the cluster operator which is a linear combination of operators $P_j$ parametrized by weights $\vec{K}$.

12. The system of claim 11, wherein the method further comprises:
(C) performing mean-field approximation to generate and store, in the non-transitory computer-readable medium, computer-readable data representing a description of a third quantum circuit to prepare a reference state;
(D) generating and storing, in the non-transitory computer-readable medium, computer-readable data representing a description of a parametrized quantum circuit for approximating $e^{\iota T(\vec{\kappa})}$;
(E) on the quantum computer, executing the third quantum circuit to prepare the reference state;
(F) on the quantum computer, applying the parametrized quantum circuit to the reference state to generate the ansatz state $|\psi(\vec{K})\rangle$;
(G) using the classical computer in cooperation with the quantum computer to measure an energy of the ansatz $|\psi(\vec{K})\rangle$; and
(H) on the classical computer, iteratively tuning the parameters is to minimize the energy of the ansatz $|\psi(\vec{K})\rangle$.

* * * * *